United States Patent
Suezawa

(10) Patent No.: US 10,979,518 B2
(45) Date of Patent: Apr. 13, 2021

(54) TERMINAL APPARATUS AND ANALYSIS SYSTEM

(71) Applicant: FUJI XEROX CO., LTD., Tokyo (JP)

(72) Inventor: Yoshihito Suezawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/935,817

(22) Filed: Jul. 22, 2020

(65) Prior Publication Data

US 2020/0351364 A1  Nov. 5, 2020

Related U.S. Application Data

(62) Division of application No. 14/625,258, filed on Feb. 18, 2015, now abandoned.

(30) Foreign Application Priority Data

Aug. 25, 2014 (JP) ................................. 2014-170525
Sep. 11, 2014 (JP) ................................. 2014-185109

(51) Int. Cl.
*G06F 3/0482* (2013.01)
*H04L 29/08* (2006.01)
(Continued)

(52) U.S. Cl.
CPC ............ *H04L 67/22* (2013.01); *G06F 3/0482* (2013.01); *G06F 3/04842* (2013.01); *G06F 9/451* (2018.02); *G06F 9/44505* (2013.01)

(58) Field of Classification Search
CPC ..... H04L 67/22; G06F 3/04842; G06F 9/451; G06F 3/0482; G06F 9/44505; G06F 3/048

See application file for complete search history.

(56) References Cited

U.S. PATENT DOCUMENTS

| 5,396,264 A | 3/1995 | Falcone et al. |
| 2005/0154999 A1 | 7/2005 | Wugoski |

(Continued)

FOREIGN PATENT DOCUMENTS

| JP | H08-044520 A | 2/1996 |
| JP | 2000-194779 A | 7/2000 |

(Continued)

OTHER PUBLICATIONS

May 8, 2018 Office Action issued in Japanese Patent Application No. 2014-170525.

(Continued)

*Primary Examiner* — Jeanette J Parker
(74) *Attorney, Agent, or Firm* — Oliff PLC

(57) ABSTRACT

An editor edits an arrangement of a plurality of pictograms in a display area, the pictograms corresponding to functions to be executed. A generator generates hysteresis information indicating a hysteresis of the edit. A first transmitter transmits display area information indicating the display area to other terminal apparatus. A receiver receives hysteresis information indicating a hysteresis of processing relating to the display area indicated by the display area information, the processing being performed in the other terminal apparatus. A display unit correlates and display the hysteresis information generated by the generator and the hysteresis information received by the receiver. A second transmitter transmits the hysteresis information generated by the generator and the hysteresis information received by the receiver to a terminal apparatus which has transmitted the display area information to the own apparatus.

2 Claims, 31 Drawing Sheets

(51) Int. Cl.
    *G06F 9/451*    (2018.01)
    *G06F 3/0484*   (2013.01)
    *G06F 9/445*    (2018.01)

(56) References Cited

U.S. PATENT DOCUMENTS

| | | |
|---|---|---|
| 2006/0020566 A1 | 1/2006 | Wu et al. |
| 2006/0294152 A1* | 12/2006 | Kawabe .................. G06F 16/93 |
| 2009/0327184 A1 | 12/2009 | Nishizaki et al. |
| 2013/0086510 A1* | 4/2013 | Lee ....................... G06F 3/0489 |
| | | 715/781 |
| 2014/0136672 A1 | 5/2014 | Sullivan et al. |
| 2014/0172167 A1* | 6/2014 | Matsukuma ............. B25J 9/161 |
| | | 700/259 |

FOREIGN PATENT DOCUMENTS

| | | |
|---|---|---|
| JP | 2002-183369 A | 6/2002 |
| JP | 2006-092337 A | 4/2006 |
| JP | 2006-343842 A | 12/2006 |
| JP | 2007-004649 A | 1/2007 |
| JP | 2010-128512 A | 6/2010 |

OTHER PUBLICATIONS

Nov. 27, 2018 Office Action issued in Japanese Patent Application No. 2014-170525.

* cited by examiner

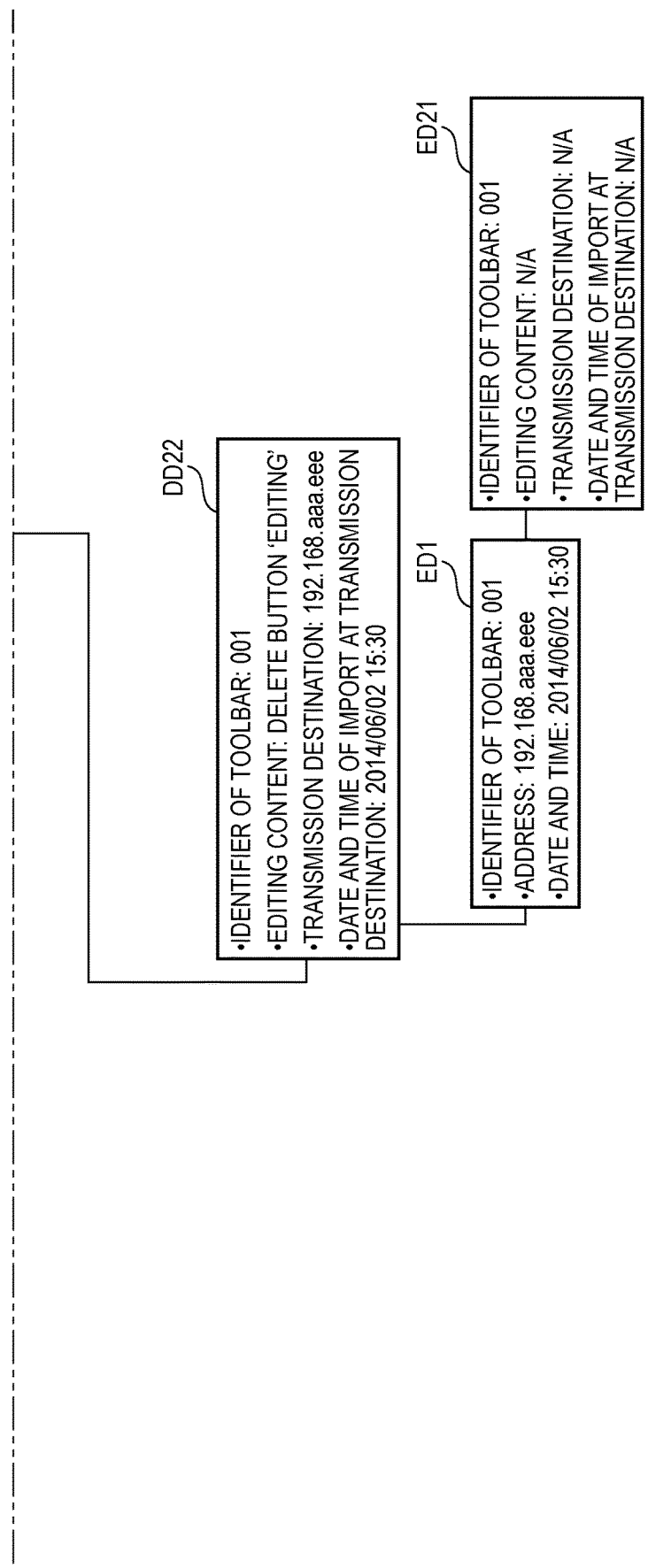

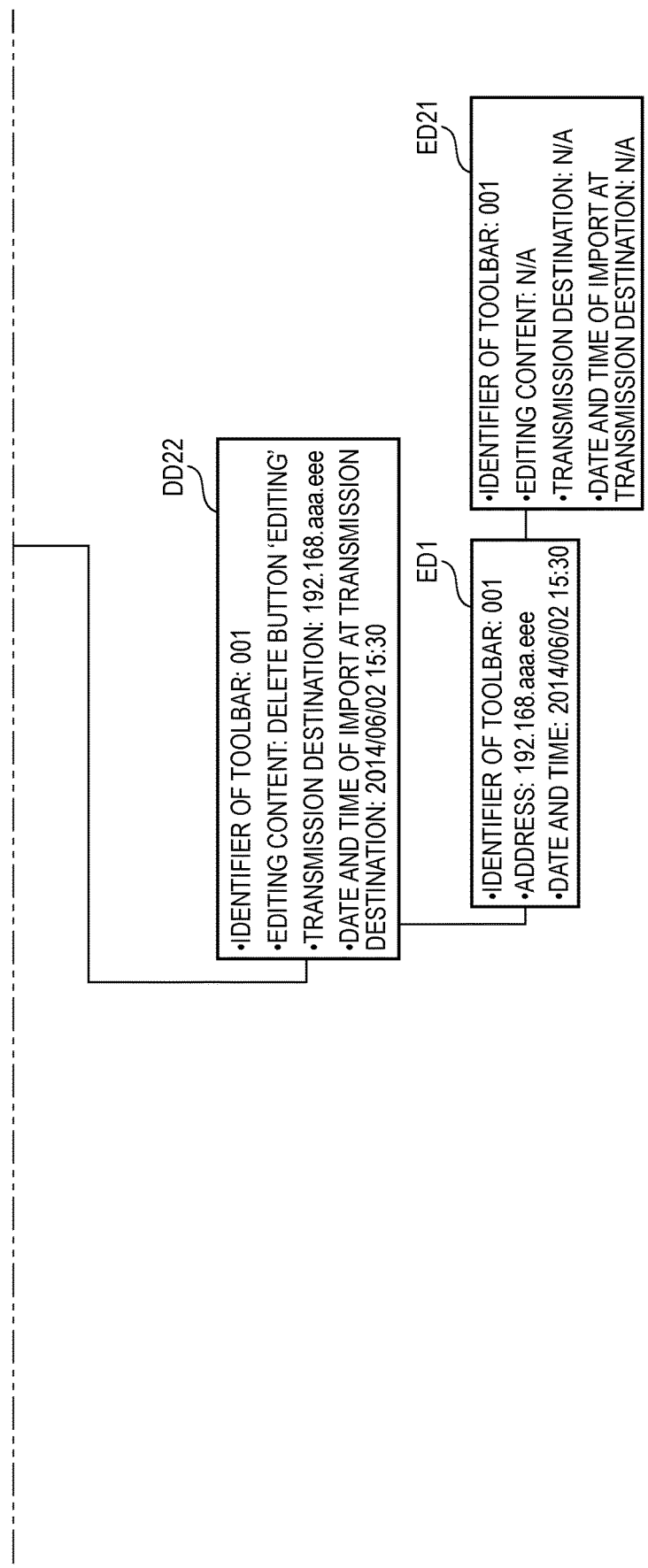

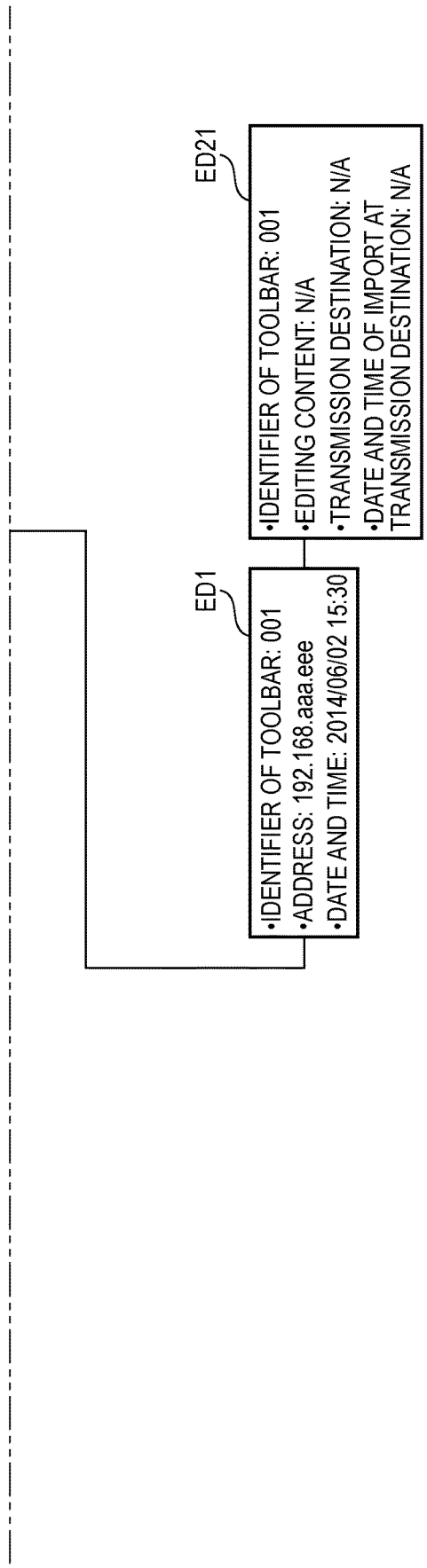

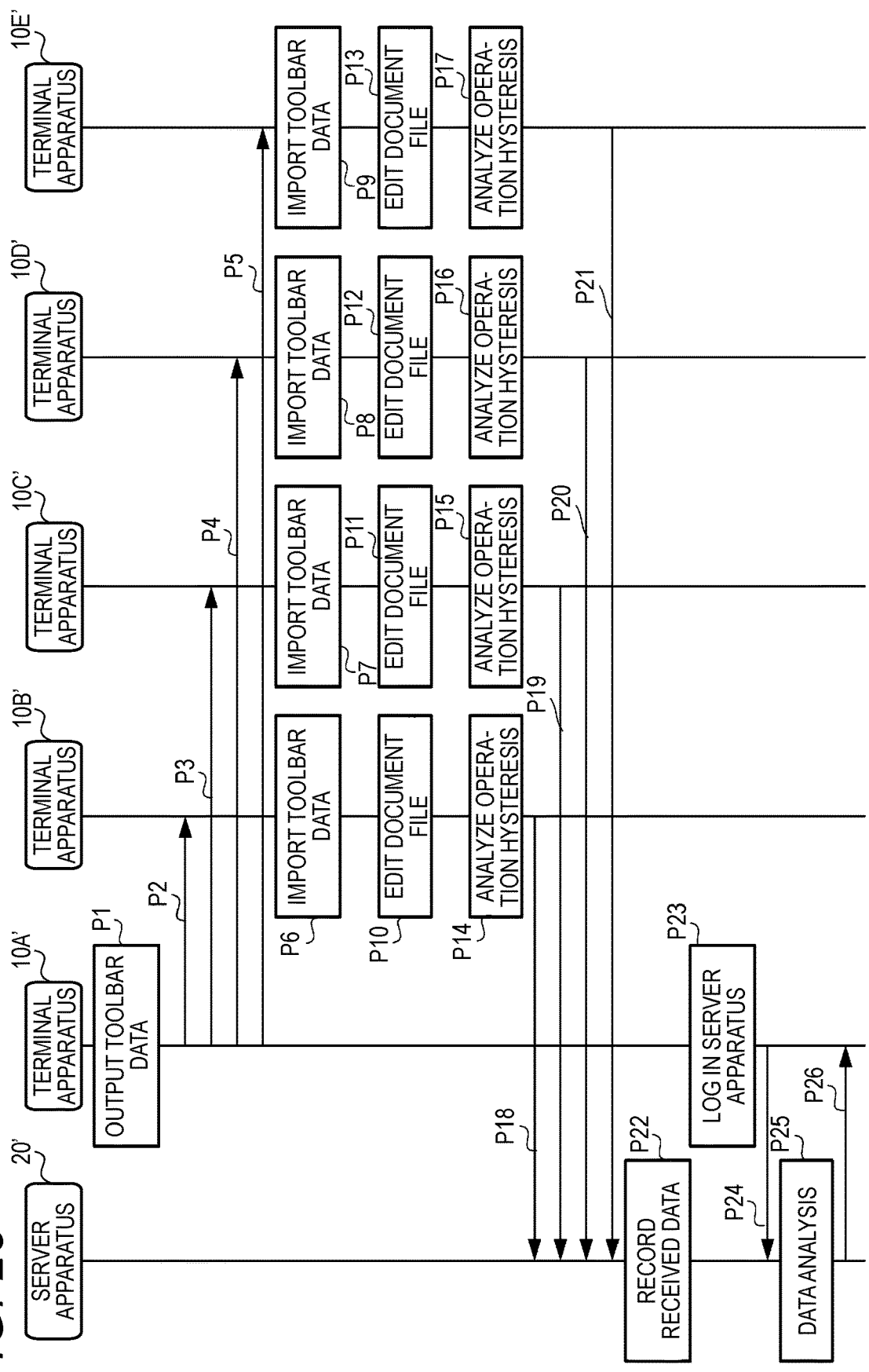

FIG. 29

| PDF PREPARA- TION | CHARACTER RECOGNITION | PAGE REARRANGE- MENT | EDITING | SAVE |
|---|---|---|---|---|
| 1 | 3 | 2 | 4 | 5 |
| 1 | 2 | 4 | 3 | 5 |
| 1 | 3 | 2 | 4 | 5 |

FIG. 30

| PDF PREPARA- TION | CHARACTER RECOGNITION | PAGE REARRANGE- MENT | EDITING | SAVE |
|---|---|---|---|---|
| 1 | 2 | 2 | 4 | 5 |

FIG. 31

| PDF PREPARA- TION | CHARACTER RECOGNITION | PAGE REARRANGE- MENT | EDITING | SAVE |
|---|---|---|---|---|
| 0 | 2 | 3 | 1 | 0 |

FIG. 32

| TOOLBAR IDENTIFIER: TB001 | | TRANSMISSION DESTINATION: 192.168.AAA.BBB | | | |
|---|---|---|---|---|---|
| USER NAME | PDF PREPARATION | CHARACTER RECOGNITION | PAGE REARRANGE- MENT | EDITING | SAVE |
| USER B | 0 | 2 | 3 | 1 | 0 |
| USER C | 1 | 0 | 1 | 0 | 0 |
| USER D | 0 | 2 | 2 | 0 | 0 |
| USER E | 0 | 0 | 2 | 2 | 0 |

TERMINAL APPARATUS AND ANALYSIS SYSTEM

CROSS-REFERENCE TO RELATED APPLICATIONS

This is a Divisional of application Ser. No. 14/625,258 filed Feb. 18, 2015, which claims the benefit of Japanese Priority Application No. 2014-170525 filed Aug. 25, 2014 and Japanese Priority Application No. 2014-185109 filed Sep. 11, 2014. The disclosure of each of the prior applications is hereby incorporated by reference herein in its entirety.

TECHNICAL FIELD

The present invention relates to a terminal apparatus and an analysis system.

SUMMARY

According to a first aspect of illustrative embodiments of the present invention, there is provided a terminal apparatus comprising: an editor configured to edit a display area comprising a plurality of images corresponding to functions to be executed; a generator configured to generate hysteresis information indicating a hysteresis of processing relating to the display area; a first transmitter configured to transmit display area information indicating the display area to other terminal apparatus; and a receiver configured to receive hysteresis information indicating a hysteresis of processing relating to the display area indicated by the display area information, the processing being performed in the other terminal apparatus.

According to a second aspect of the illustrative embodiments of the present invention, there is provided a communication system comprising: a first terminal apparatus comprising: an editor configured to edit a display area comprising a plurality of images corresponding to functions to be executed; a first generator configured to generate hysteresis information indicating a hysteresis of processing relating to the display area; a first transmitter configured to transmit display area information indicating the display area to other terminal apparatus; and a first receiver configured to receive hysteresis information indicating a hysteresis of processing relating to the display area indicated by the display area information, the processing being performed in the other terminal apparatus; and a second terminal apparatus comprising: a second receiver configured to receive the display area information transmitted by the first transmitter; a second generator configured to generate hysteresis information indicating a hysteresis of processing relating to the display area information received by the second receiver; and a second transmitter configured to transmit the hysteresis information generated by the second generator to the first terminal apparatus.

According to a third aspect of the illustrative embodiments of the present invention, there is provided a non-transitory computer readable medium storing a program for enabling a computer to function as: an editor configured to edit a display area comprising a plurality of images corresponding to functions to be executed; a generator configured to generate hysteresis information indicating a hysteresis of processing relating to the display area; a first transmitter configured to transmit display area information indicating the display area to other terminal apparatus; and a receiver configured to receive hysteresis information indicating a hysteresis of processing relating to the display area indicated by the display area information, the processing being performed in the other terminal apparatus.

According to a fourth aspect of the illustrative embodiments of the present invention, there is provided an analysis system comprising: a terminal apparatus comprising: a display controller configured to display a plurality of images corresponding to functions to be executed on a display unit; a recorder configured to record an operation hysteresis, which is a hysteresis of a user's operation performed for the images; and a transmitter configured to transmit information, which indicates that the operation hysteresis recorded by the recorder is different from a predetermined operation; and an analysis apparatus comprising: a receiver configured to receive the information transmitted by the transmitter; and an output unit configured to output information, which indicates that the user's operation is different from the predetermined operation, on the basis of the information received by the receiver.

According to a fifth aspect of the illustrative embodiments of the present invention, there is provided a terminal apparatus comprising: a display controller configured to display a plurality of images corresponding to functions to be executed on a display unit; a recorder configured to record an operation hysteresis, which is a hysteresis of a user's operation performed for the images; and a transmitter configured to transmit information, which indicates that the operation hysteresis recorded by the recorder is different from a predetermined operation.

According to a sixth aspect of the illustrative embodiments of the present invention, there is provided a non-transitory computer readable medium storing a program for enabling a computer to function as: a display controller configured to display a plurality of images corresponding to functions to be executed on a display unit; a recorder configured to record an operation hysteresis, which is a hysteresis of a user's operation performed for the images; and a transmitter configured to transmit information, which indicates that an operation hysteresis recorded by the recorder is different from a predetermined operation.

BRIEF DESCRIPTION OF THE DRAWINGS

Exemplary embodiments of the present invention will be described in detailed based on the following figures, wherein:

FIG. 28 is a sequence diagram showing an example of an operation according to the second illustrative embodiment;

FIG. 29 shows an example of an operation hysteresis;

FIG. 30 shows an example of operation sequence data;

FIG. 31 shows an example of data obtained by analysis of the server apparatus 20;

FIG. 32 shows an example of data obtained by analysis of the server apparatus 20;

DETAILED DESCRIPTION

First Illustrative Embodiment

Figure 1:
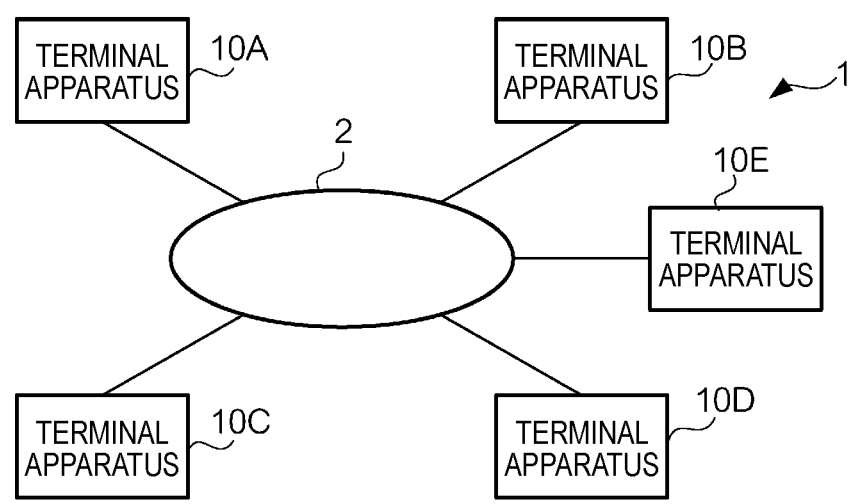
FIG. 1 shows apparatuses relating to a communication system 1 according to a first illustrative embodiment of the present invention.

FIG. 1 shows apparatuses relating to a communication system 1 according to a first illustrative embodiment of the present invention. A communication line 2 is a LAN (Local Area Network) through which data communication is performed, and a plurality of computer apparatuses is connected thereto. The communication line 2 is not limited to the LAN, and may include a communication line through which the computer apparatus performs communication, such as WAN, Internet and telephone line. Terminal apparatuses 10A to 10E are apparatuses configured to perform data communication, and are so-called PCs in this first illustrative embodiment. The terminal apparatuses 10A to 10E are connected to the communication line 2 and are configured to perform data communication through the communication line 2. Since the terminal apparatuses 10A to 10E have the same hardware configuration, they are simply referred to as 'terminal apparatus 10' when it is not necessary to distinguish the same.

(Configuration of Terminal Apparatus 10)

Figure 2:
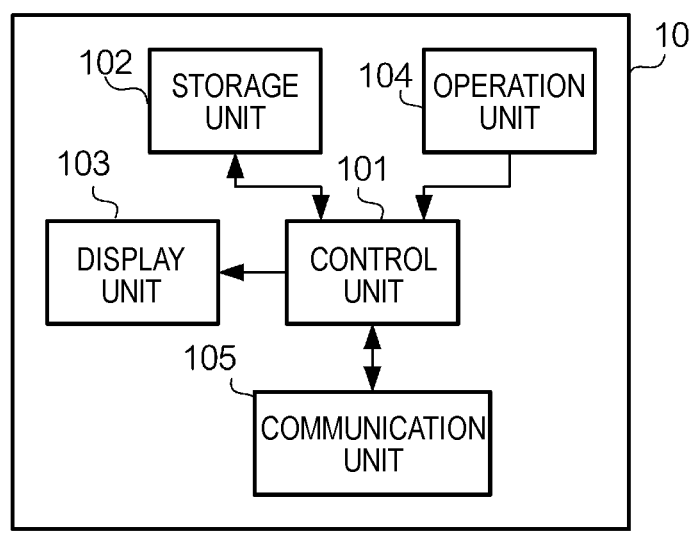
FIG. 2 is a block diagram showing a hardware configuration of a terminal apparatus 10.

FIG. 2 shows an example of the hardware configuration of the terminal apparatus 10. A display unit 103 has a display device. The display unit 103 is configured to display a variety of screens for operating the terminal apparatus 10, for example. An operation unit 104 has an input device for operating the terminal apparatus 10, such as a keyboard and a mouse. A communication unit 105 functions as a communication interface for performing data communication.

A storage unit 102 has a device (for example, a hard disk drive) for permanently storing therein data, and is configured to store therein a program of an operating system, an application program, a document file indicating a document, and the like. In this first illustrative embodiment, the storage unit 102 is configured to store therein an application program (hereinafter, referred to as document management application) for implementing functions of displaying, editing and managing a document file, and the like.

A control unit 101 has a CPU (Central Processing Unit) and a RAM (Random Access Memory) and is configured to execute the program of the operating system and the application program. When the CPU executes the document management application, the functions of displaying, editing and managing a document file, and the like are implemented.

Figure 3:
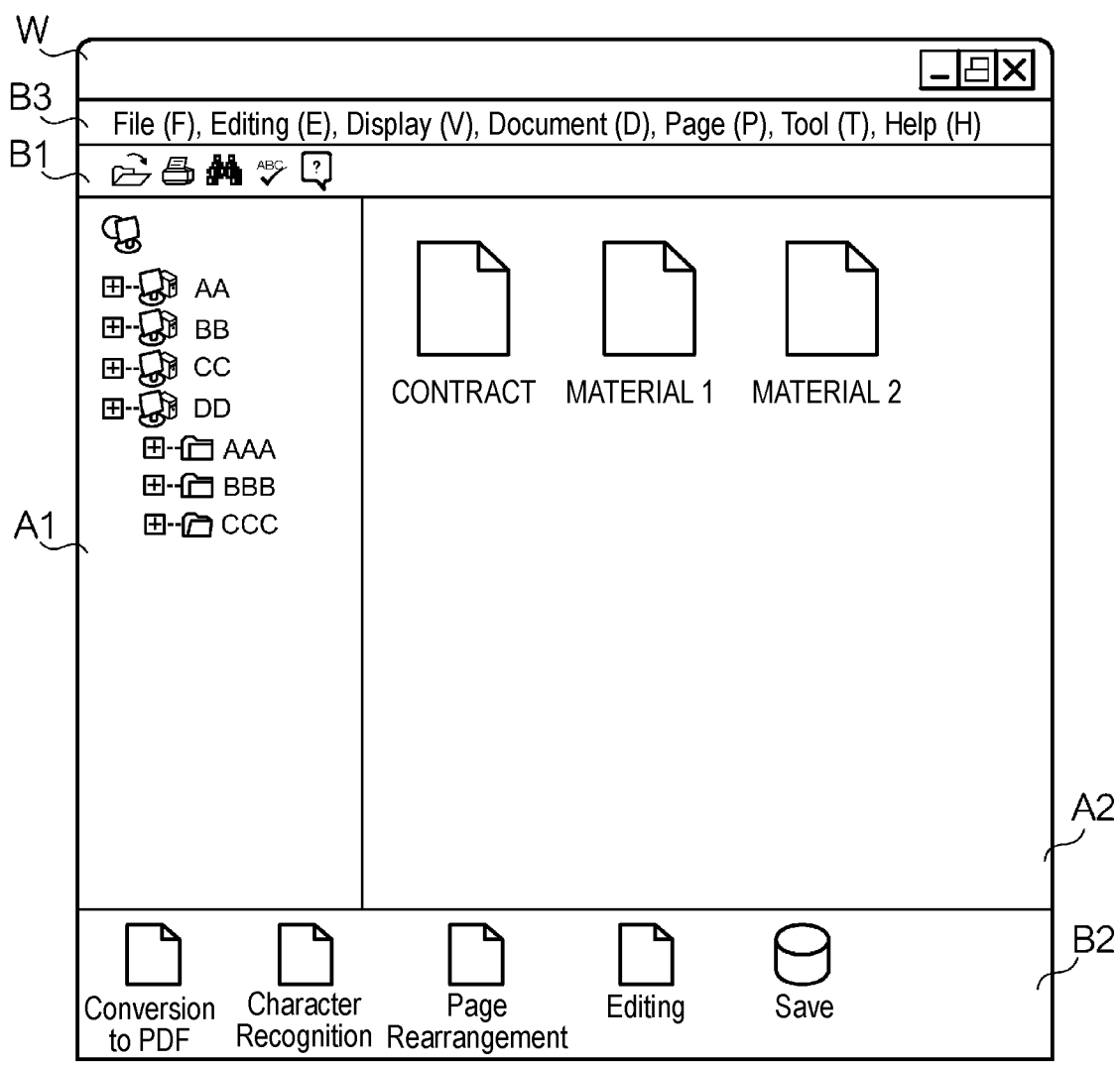
FIG. 3 illustrates an example of a GUI configured to be displayed on the terminal apparatus 10.

FIG. 3 illustrates an example of a GUI (Graphical User Interface) that is displayed on the display unit 103 as the document management application is executed. The GUI has, in a window W, a first toolbar B1 on which button icons corresponding to predetermined functions are arranged, a second toolbar B2 on which an editing of adding, deleting and arranging a button icon corresponding to a function (which is an example of an image corresponding to a function) can be performed by a user's operation, a menu bar B3, a first display area A1 configured to display a folder tree and a second display area A2 configured to display a document. The second toolbar B2 is an example of a display area of an image corresponding to a function. In the meantime, an editing of adding, deleting and arranging a button icon corresponding to a function can be performed on the first toolbar B1. Also, the GUI of the document management application may have a plurality of second toolbars B2 and display each of the second toolbars B2 in a tap bar form and may be configured so that an arrangement order of taps can be edited.

Figure 4:
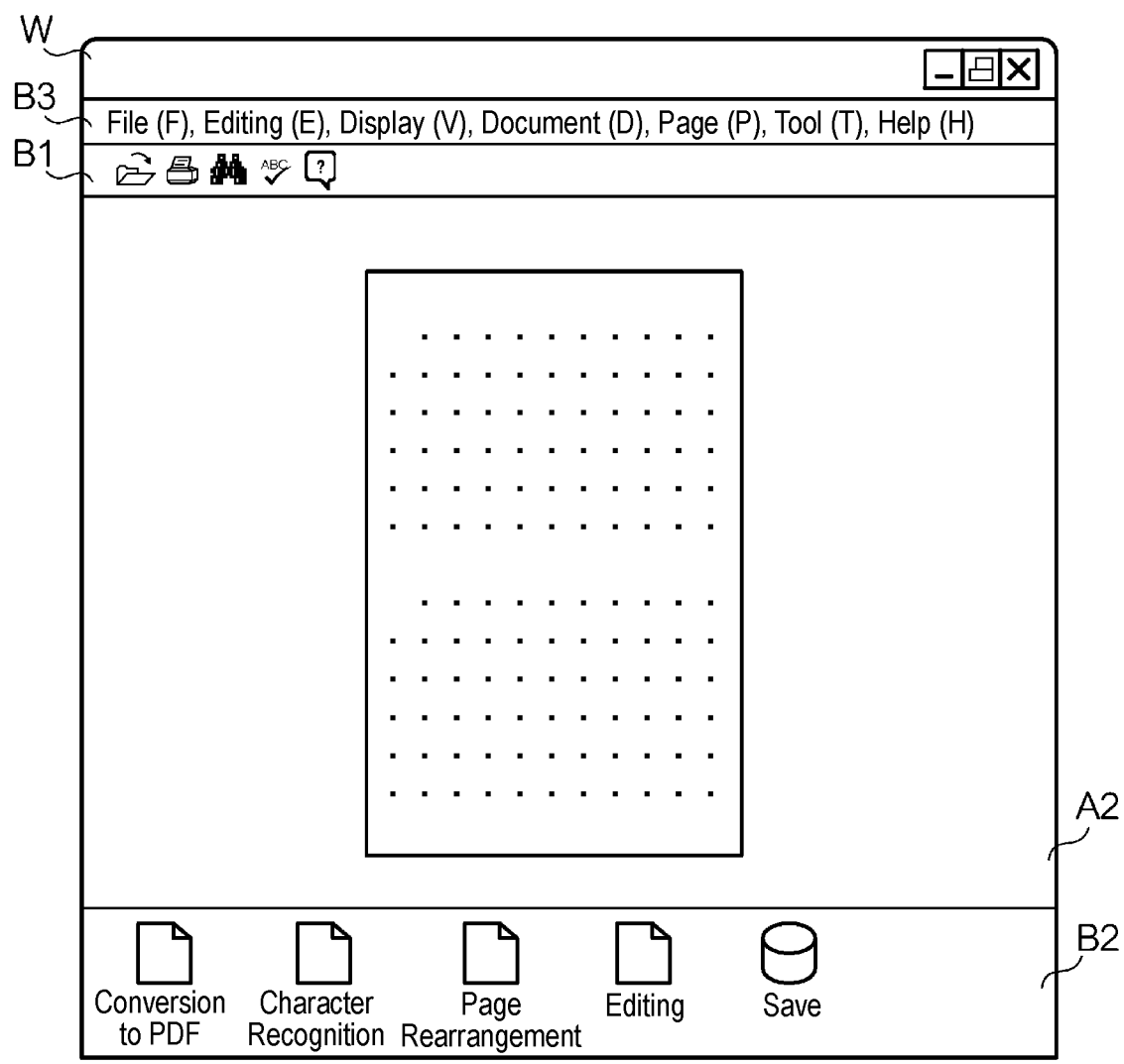
FIG. 4 illustrates an example of a GUI configured to be displayed on the terminal apparatus 10.

When a user selects a folder in the first display area A1, files in the folder are displayed in an icon form in the second display area A2, as shown in FIG. 3. When the user performs an operation of selecting an icon displayed in the second display area A2 to open a file, a content of the file is displayed as shown in FIG. 4.

The second toolbar B2 is an example of a distinguishing toolbar of the present invention. When the user operates the operation unit 104, the control unit 101 adds, deletes or rearranges a button on the second toolbar B2. When the user operates a button displayed on the second toolbar B2, the control unit 101 executes a function corresponding to the operated button.

For example, when performing a series of operations of converting an image file of a document read by a scanner into a PDF (Portable Document Format), performing character recognition to generate text data, rearranging pages, editing the text data and saving the edited document file, if a button 'conversion to PDF' corresponding to a function of converting an image file to a PDF, a button 'character recognition' corresponding to a function of character recognition, a button 'page rearrangement' corresponding to a function of rearranging a page, a button 'editing' corresponding to a function of editing text data and a button 'save' corresponding to a function of saving a file are arranged from left in conformity of the operation sequence, as shown in FIG. 3, it is possible to execute the series of operations in order.

Also, the second toolbar B2 is configured to be exported and imported, in response to a user's operation. When the user performs an operation of exporting the second toolbar B2, the control unit 101 outputs toolbar data indicating the second toolbar B2. Also, when the user performs an operation of importing toolbar data, the control unit 101 arranges a variety of buttons in an area of the second toolbar B2, in response to a content of the toolbar data.

By transmitting the output toolbar data to the other terminal apparatus 10 and importing the same at the other apparatus 10, the same second toolbar B2 as the terminal apparatus 10 having transmitted the toolbar data is displayed on the other terminal apparatus 10, too. For example, when a user (hereinafter, referred to as user A) of the terminal apparatus 10A asks a user (hereinafter, referred to as user B) of the terminal apparatus 10B to work as the content of the second toolbar B2 shown in FIG. 3, the user A exports the second toolbar B2 and transmits the toolbar data to the terminal apparatus 10B. When the user B imports the transmitted toolbar data at the terminal apparatus 10B, the user B can perform a series of operations in order with the second toolbar B2 set by the user A. In the meantime, since the toolbar data can be transmitted to the terminal apparatus 10 of another user, the toolbar data transmitted from the terminal apparatus 10A can be transmitted from the terminal apparatus 10B to the terminal apparatus 10C or terminal apparatus 10D and can be further transmitted from the terminal apparatus 10D to the terminal apparatus 10E, for example.

Since the button can be added, deleted or rearranged on the second toolbar B2 by the user's operation, the second toolbar B2 may be edited at the terminal apparatus 10 having acquired the toolbar data and then the toolbar data of the edited content may be transmitted to another terminal apparatus 10. In this first illustrative embodiment, the document management application has a function of obtaining a transmission destination of the toolbar data transmitted from one terminal apparatus 10 and an editing hysteresis of the transmitted toolbar data.

(Functional Configuration of Terminal Apparatus 10)

Figure 5:
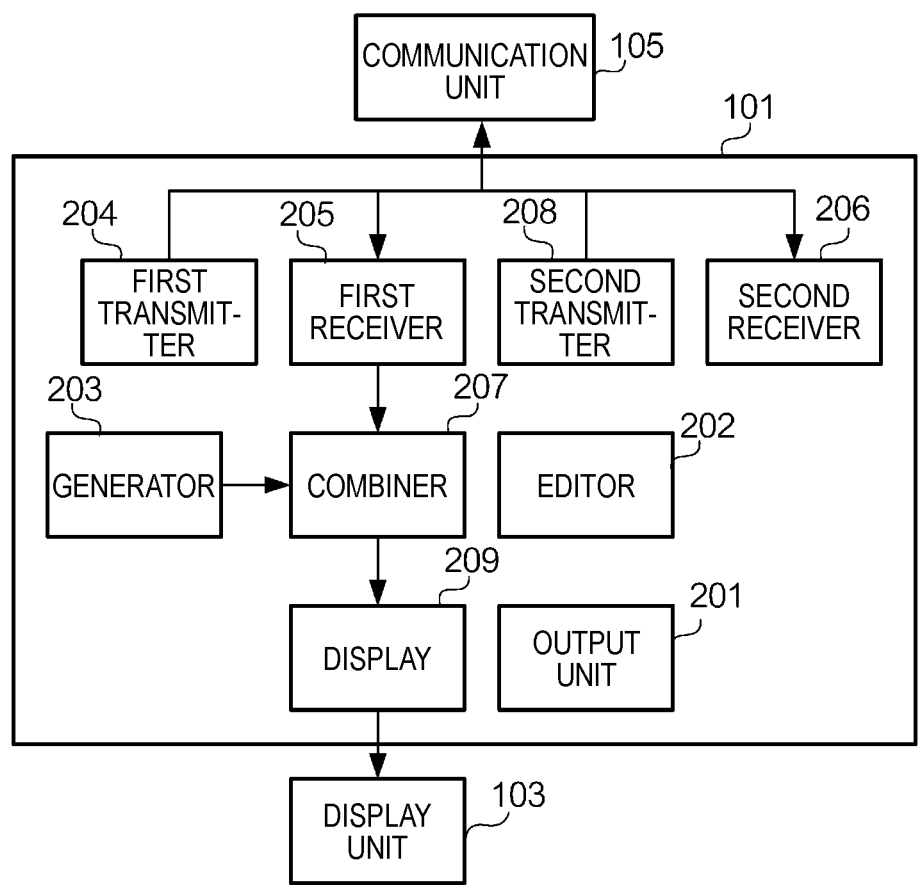
FIG. 5 is a functional block diagram of the terminal apparatus 10.

FIG. 5 is a functional block diagram showing a function of obtaining a transmission destination of toolbar data and an editing hysteresis of toolbar data of the functions that are implemented as the document management application is executed.

An output unit 201 is to output the toolbar data of the second toolbar B2. The second toolbar B2 is an example of a display area including a button (an example of an image corresponding to a function) corresponding to a function to be executed, and the toolbar data is an example of display area information indicating the second toolbar B2. In other words, the output unit 201 is to output the display area information indicating a display area including an image corresponding to a function to be executed.

An editor 202 is to add, delete and rearrange the button (image corresponding to a function) of the second toolbar B2, in response to a user's operation performed on the operation unit 104.

A generator 203 is to generate hysteresis information indicating a hysteresis of processing relating to the second toolbar B2. The hysteresis information includes management data, first data, second data and the like, which will be described later. The generator 203 is an example of the generator and second generator of the present invention.

A first transmitter 204 is to control the communication unit 105 to transmit the toolbar data (display area information) to other terminal apparatus 10.

A first receiver 205 is to control the communication unit 105 to receive the first data and second data (hysteresis information) generated at the transmission destination of the toolbar data (display area information). The first receiver 205 is an example of the receiver of the present invention.

A second receiver 206 is to receive the toolbar data transmitted from other terminal apparatus.

A combiner 207 is to combine (correlate) the first data and second data (hysteresis information) generated by the first transmitter 204 with the first data and second data (hysteresis information) received by the first receiver 205.

A second transmitter 208 is to transmit the hysteresis information to the terminal apparatus 10, which is an upper apparatus having transmitted the toolbar data to the own apparatus. The second transmitter 208 is an example of the third transmitter of the present invention.

A display 209 is to display the data combined and correlated by the combiner 207. The display 209 controls the display unit 103 to display the data combined by the combiner 207.

Example of Operation of First Illustrative Embodiment

Figure 6:
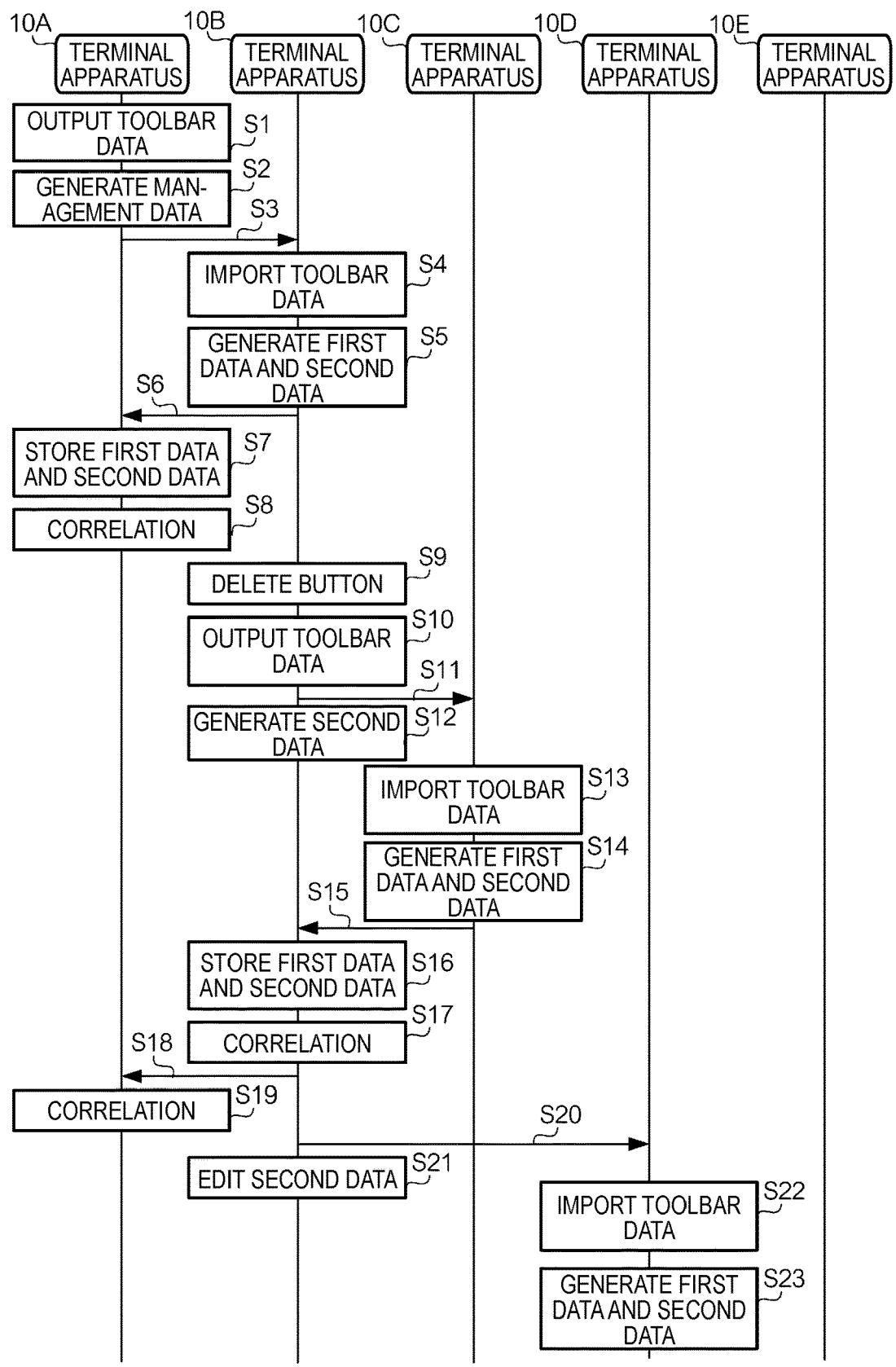
FIG. 6 is a sequence diagram showing an example of an operation according to the first illustrative embodiment.
Figure 7:
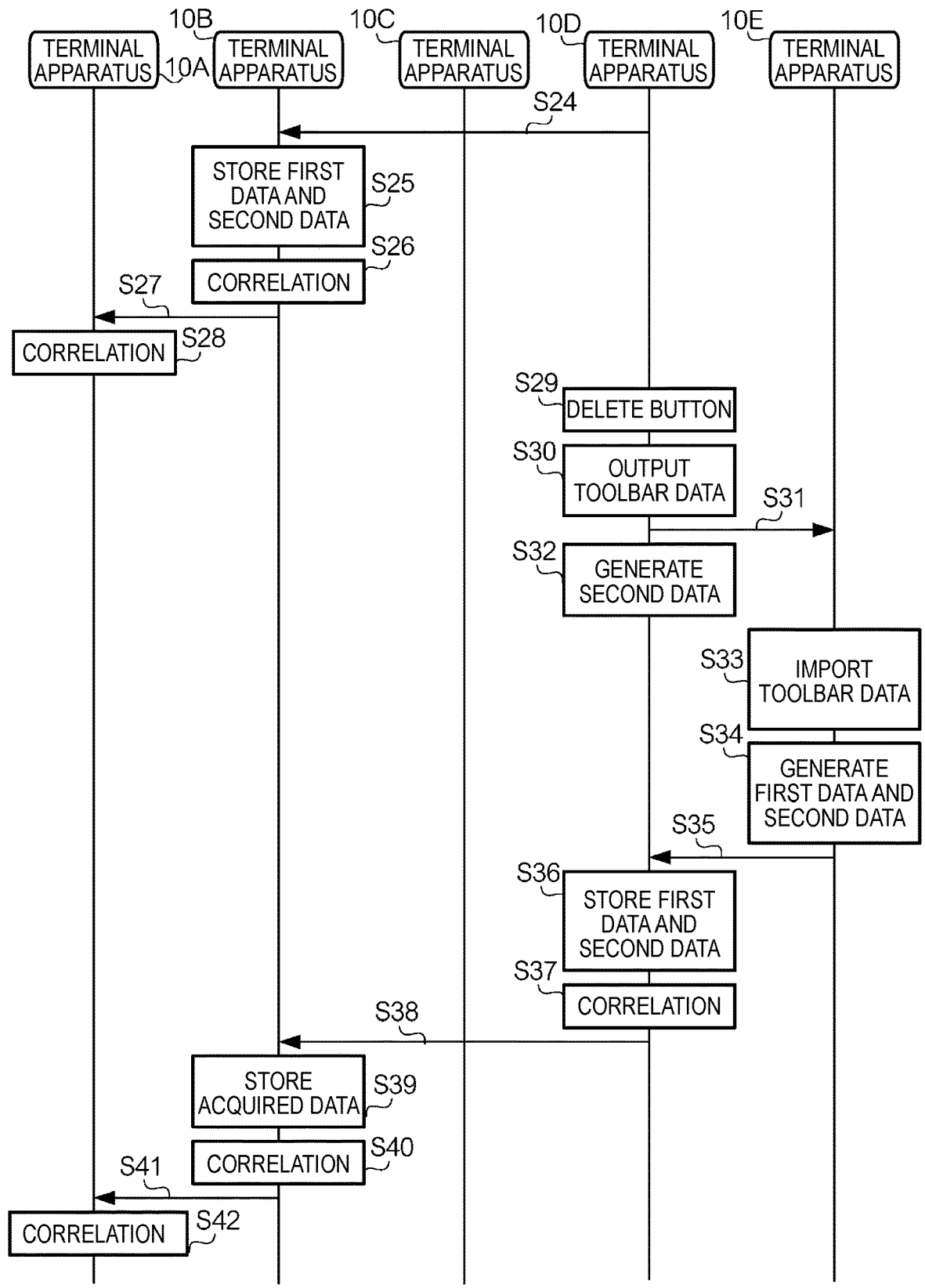
FIG. 7 is a sequence diagram showing the example of the operation according to the first illustrative embodiment.

Subsequently, an example of an operation of this first illustrative embodiment is described with reference to sequence diagrams of FIGS. 6 and 7. In the example of the operation, a case is exemplified in which the second toolbar B2 of FIG. 3 set at the terminal apparatus 10A is imported to the terminal apparatus 10B, the second toolbar B2 edited at the terminal apparatus 10B is imported to the terminal apparatus 10C and the terminal apparatus 10D, and the second toolbar B2 edited at the terminal apparatus 10D is further imported to the terminal apparatus 10E. In below descriptions, when it is necessary to distinguish the hardware configurations and functional configurations of the respective terminal apparatuses 10, the respective units of the terminal apparatus 10A are denoted with the corresponding reference numerals having 'A' attached to an end thereof, the respective units of the terminal apparatus 10B are denoted with the corresponding reference numerals having 'B' attached to an end thereof, the respective units of the terminal apparatus 10C are denoted with the corresponding reference numerals having 'C' attached to an end thereof, the respective units of the terminal apparatus 10D are denoted with the corresponding reference numerals having 'D' attached to an end thereof and the respective units of the terminal apparatus 10E are denoted with the corresponding reference numerals having 'E' attached to an end thereof, for convenience of explanations.

When the user A asks the user B to perform a series of operations of conversion of an image file into a PDF, character recognition, page rearrangement, editing of text data, save of a document file, and the like, the user A performs an operation of exporting the second toolbar B2 of FIG. 3 on the operation unit 104A at the terminal apparatus 10A in which the document management application is being executed. The control unit 101A outputs toolbar data, in response to the performed operation (step S1). When exporting the newly prepared second toolbar B2, the control unit 101A adds an identifier for identifying the second toolbar B2 and an identifier (for example, IP address) of the terminal apparatus 10A having output the toolbar data, to the toolbar data to be output here.

Also, when exporting the newly prepared second toolbar B2, the control unit 101A generates management data AD1 including an identifier for identifying the second toolbar B2 and date and time of the export (step S2). The management data AD1 is an example of the hysteresis information relating to the second toolbar B2.

When the user A performs an operation of transmitting the output toolbar data to the terminal apparatus 10B, the control unit 101A controls the communication unit 105A to transmit the toolbar data to the terminal apparatus 10B (step S3).

The communication unit 105B of the terminal apparatus 10B receives the transmitted toolbar data. When the user B performs an operation of importing the toolbar data on the operation unit 104B at the terminal apparatus 10B in which the document management application is being executed, the control unit 101B executes processing of importing the toolbar data (step S4). When the control unit 101B executes processing of importing the toolbar data, a window having the second toolbar B2 of FIG. 3 is displayed on the display unit 103B.

Figure 8:
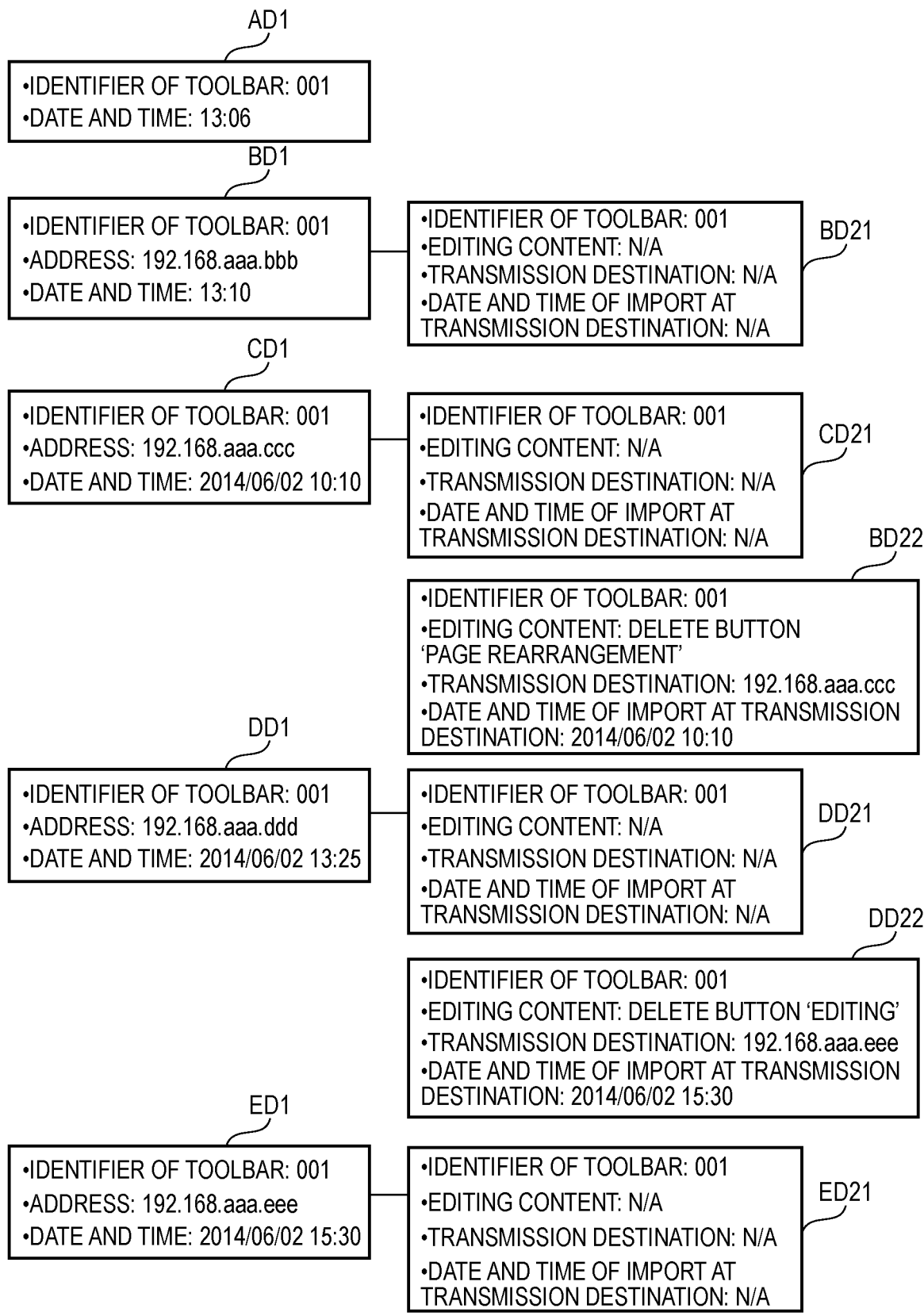
FIG. 8 shows an example of first data and second data.

When the toolbar data is imported, the control unit 101B generates first data including date and time of the import and second data including information relating to the imported second toolbar B2 (step S5). The first data and the second data are examples of the hysteresis information relating to the second toolbar B2. First data BD1 and second data BD21 shown in FIG. 8 are examples of the first data and second data generated by the control unit 101B upon the import of the toolbar data.

The first data BD1 includes the identifier of the second toolbar B2 added to the imported toolbar data, an IP address of the terminal apparatus 10B to which the toolbar data is imported, and date and time at which the toolbar data is imported to the terminal apparatus 10B.

The second data BD21 includes the identifier of the second toolbar B2 added to the imported toolbar data, editing content of the second toolbar B2, a transmission destination of the toolbar data of the edited second toolbar B2, date and time of import at the transmission destination of the toolbar data of the edited second toolbar B2, and the like. Since the second toolbar B2 has not been edited yet at the terminal apparatus 10B at a point of time at which the toolbar data was imported to the terminal apparatus 10B, an item of the editing content in the second data BD21 is set as 'N/A'. Also, since the second toolbar B2 has not been transmitted yet from the terminal apparatus 10B to the other terminal apparatus 10 at a point of time at which the toolbar data was imported to the terminal apparatus 10B, the transmission destination in the second data BD21 is set as 'N/A'. Also, since the toolbar data has not been transmitted yet from the terminal apparatus 10B to the other terminal apparatus 10 at a point of time at which the toolbar data was imported to the terminal apparatus 10B, the date and time of import at the transmission destination in the second data BD21 is set as 'N/A'.

The control unit 101B controls the communication unit 105B to transmit a set of the generated first data BD1 and second data BD21 to the terminal apparatus 10A, which is a transmission source of the imported toolbar data (step S6). The communication unit 105A receives the transmitted set of the first data BD1 and second data BD21. The control unit 101A stores the received set of the first data BD1 and second data BD21 in the storage unit 102A (step S7).

Figure 9:
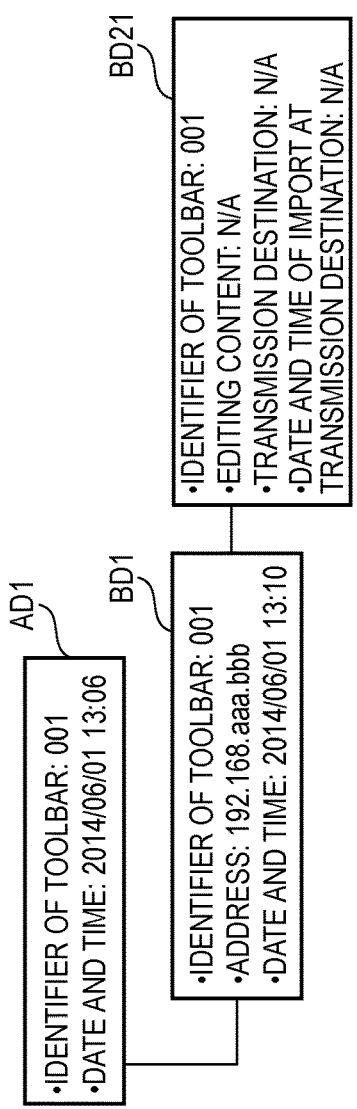
FIG. 9 shows a correlation between the first data and the second data.

The control unit 101A having acquired the first data BD1 and second data BD21 performs correlation of the hysteresis information relating to the second toolbar B2 (step S8). Here, the control unit 101A correlates the management data AD1 having the same identifier as the toolbar identifier of the received first data BD1 with the received set of the first data BD1 and second data BD21, as shown in FIG. 9.

The first data BD1 includes the date and time at which the toolbar data transmitted from the terminal apparatus 10A is imported at the terminal apparatus 10B. When the user A performs an operation of displaying the correlated data on the operation unit 104A, the user A can know the date and time at which the toolbar data is imported at the terminal apparatus 10B, through the displayed data.

Then, for example, when the user B performs an operation of deleting the button 'page rearrangement' of the second toolbar B2 displayed by the import on the operation unit 104B, the control unit 101B deletes the button 'page rearrangement' from the second toolbar B2 (step S9). Also, when the user B performs an operation of exporting the edited second toolbar B2 on the operation unit 104B, the control unit 101B outputs the toolbar data of the edited second toolbar B2 (step S10).

The identifier of the second toolbar B2 and the identifier of the terminal apparatus 10A, which have been added by the terminal apparatus 10A, are added to the toolbar data imported to the terminal apparatus 10B. However, the control unit 101B further adds an identifier (for example, IP address) of the terminal apparatus 10B having output the toolbar data to the toolbar data to be edited and output here.

When the user B performs an operation of transmitting the output toolbar data to the terminal apparatus 10C, the control unit 101B controls the communication unit 105B to transmit the toolbar data to the terminal apparatus 10C (step S11).

When the output toolbar data is transmitted, the control unit 101B generates second data BD22 including the information relating to the second toolbar B2 (step S12). At this time, since the button has been deleted from a point of time at which the toolbar data was imported, the item of the editing content in the second data BD22 is set as 'deletion of rearrangement button of page'. Also, since the toolbar data has been transmitted to the terminal apparatus 10C, the transmission destination in the second data BD22 is an IP address of the terminal apparatus 10C. The control unit 101B correlates the generated second data BD22 with the first data BD1.

The communication unit 105C of the terminal apparatus 10C receives the transmitted toolbar data. When a user C performs an operation of importing the toolbar data on the operation unit 104C at the terminal apparatus 10C in which the document management application is being executed, the control unit 101C executes processing of importing the toolbar data (step S13). When the control unit 101C executes processing of importing the toolbar data, a window having the second toolbar B2, from which the button 'page rearrangement' has been deleted, is displayed on the display unit 103C.

When the toolbar data is imported, the control unit 101C generates first data and second data (step S14). First data CD1 and second data CD21 shown in FIG. 8 are examples of the first data and second data generated by the control unit 101C upon the import of the toolbar data.

The first data CD1 includes the identifier of the second toolbar B2 added to the imported toolbar data, an IP address of the terminal apparatus 10C, and date and time at which the toolbar data is imported to the terminal apparatus 10C.

The second data CD21 includes the identifier of the second toolbar B2 added to the imported toolbar data, editing content of the second toolbar B2, a transmission destination of the toolbar data of the edited second toolbar, date and time of import at the transmission destination of the toolbar data of the edited second toolbar, and the like. Since the second toolbar B2 has not been edited yet at the terminal apparatus 10C at a point of time at which the toolbar data was imported to the terminal apparatus 10C, an item of the editing content in the second data CD21 is set as 'N/A'. Also, since the second toolbar B2 has not been transmitted yet from the terminal apparatus 10C to the other terminal apparatus 10 at a point of time at which the toolbar data was imported to the terminal apparatus 10C, the transmission destination in the second data CD21 is set as 'N/A'. Also, since the toolbar data has not been transmitted yet from the terminal apparatus 10C to the other terminal apparatus 10 at a point of time at which the toolbar data was imported to the terminal apparatus 10C, the date and time of import in the second data CD21 is set as 'N/A'.

The control unit 101C controls the communication unit 105C to transmit a set of the generated first data CD1 and second data CD21 to the terminal apparatus 10B, which is a transmission source of the imported toolbar data (step S15). The communication unit 105B receives the transmitted set of the first data CD1 and second data CD21. The control unit 101C stores the received set of the first data CD1 and second data CD21 in the storage unit 102B (step S16).

When the set of the first data CD1 and second data CD21 is acquired from the terminal apparatus 10C, which is a transmission destination of the toolbar data, the control unit 101B involves the date and time included in the first data CD1 into the second data BD22 including the IP address of the terminal apparatus 10C, as the date and time of import at the transmission destination, as shown in FIG. 8.

Figure 10:
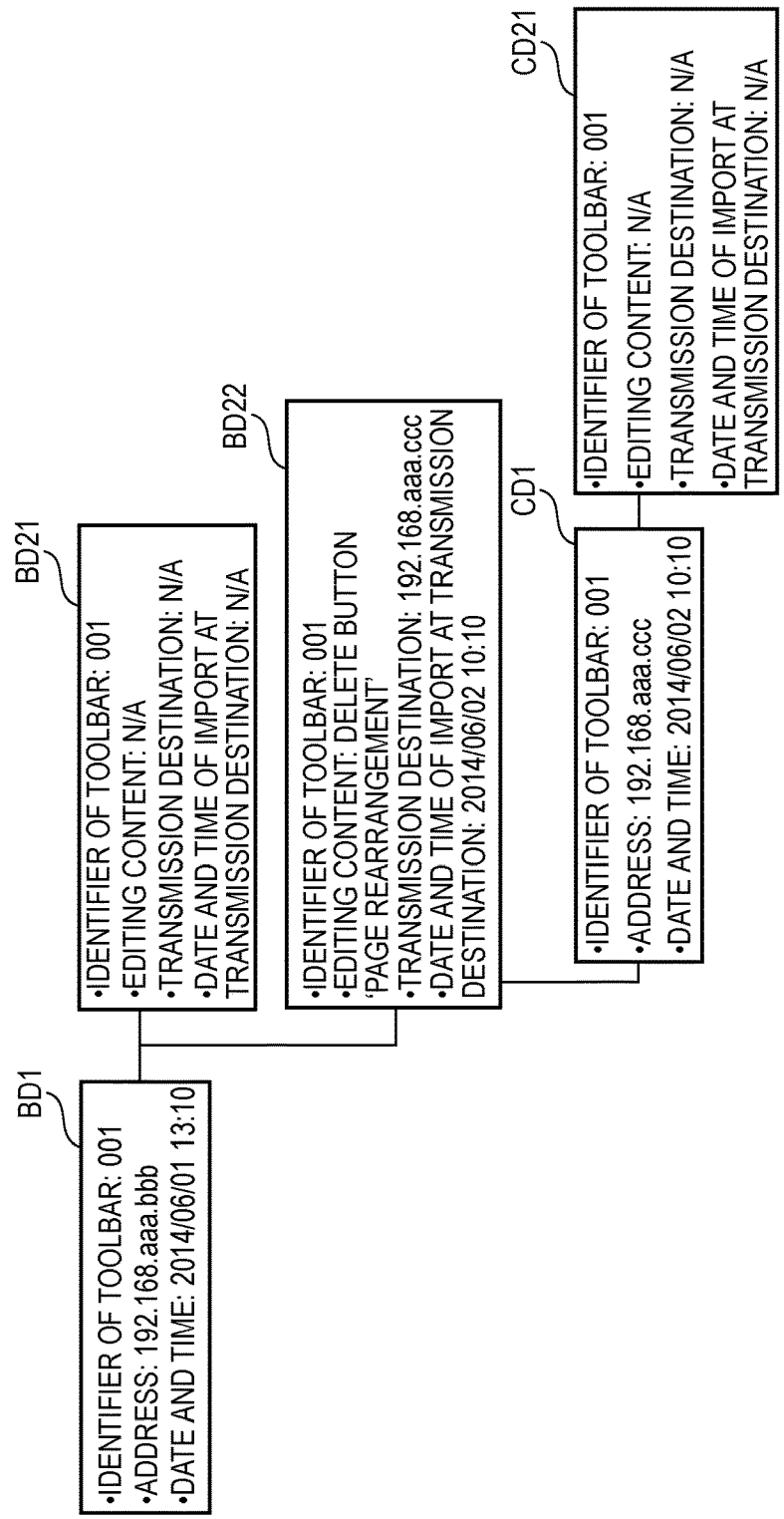
FIG. 10 shows a correlation between the first data and the second data.

Then, the control unit 101B performs correlation of data relating to the second toolbar B2 (step S17). The control unit 101B searches the second data including the same IP address as the IP address of the terminal apparatus 10C included in the acquired first data CD1. Here, since the second data BD22 includes the same IP address as the IP address of the terminal apparatus 10C included in the first data CD1, the set of the first data CD1 and second data CD21 is correlated with the second data BD22. Here, the respective data is correlated as shown in FIG. 10.

When the correlation operation is over, the control unit 101B controls the communication unit 105B to transmit the correlated data to the terminal apparatus 10A, which is a transmission source of the imported toolbar data (step S18). The communication unit 105A receives the correlated data. The control unit 101A specifies the uppermost first data BD1 in the received correlated data, and correlates the management data AD1 having the same identifier as the toolbar identifier included in the first data BD1 with the received correlated data, as shown in FIG. 11 (step S19).

Figure 11:
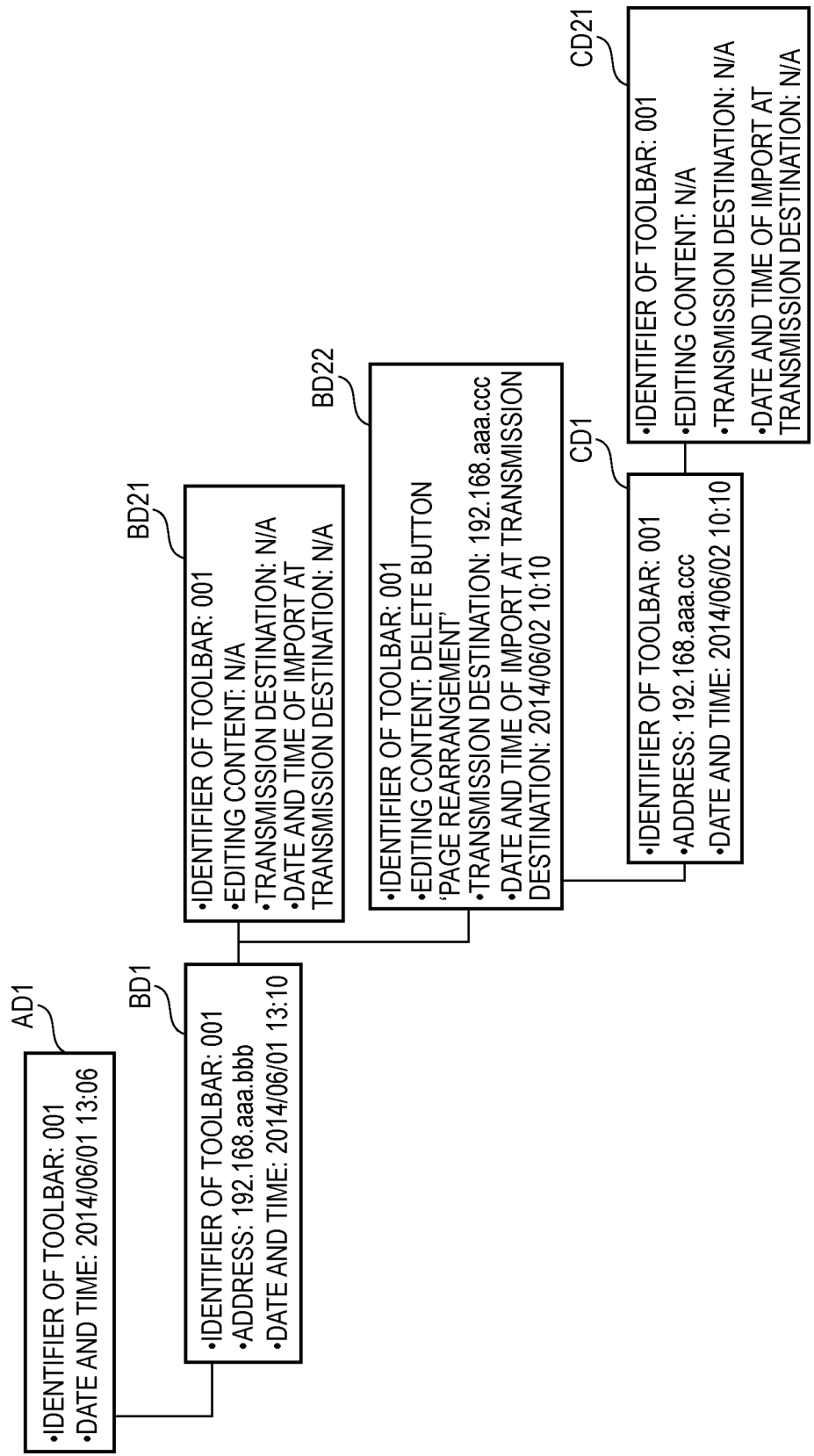
FIG. 11 shows a correlation between the first data and the second data.

When the user A performs an operation of displaying the correlated data, the respective correlated data of FIG. 11 is displayed on the display unit 103A. Here, since the first data CD1 is correlated with the second data BD22, the user A can know that the second toolbar B2 edited at the terminal apparatus 10B is imported at the terminal apparatus 10C.

Then, when the user B performs an operation of transmitting the toolbar data output in step S10 to the terminal apparatus 10D, the control unit 101B controls the communication unit 105B to transmit the toolbar data to the terminal apparatus 10D (step S20).

When the toolbar data output in step S10 is transmitted, the control unit 101B edits the second data BD22 (step S21). Here, since the toolbar data has been transmitted to the terminal apparatus 10D, an IP address of the terminal apparatus 10D, which is a transmission destination, is added to the second data BD22.

The communication unit 105D of the terminal apparatus 10D receives the transmitted toolbar data. When a user (hereinafter, referred to as user D) of the terminal apparatus 10D performs an operation of importing the toolbar data on the operation unit 104D at the terminal apparatus 10D in which the document management application is being executed, the control unit 101D executes processing of importing the toolbar data (step S22). When the control unit 101D executes processing of importing the toolbar data, a window having the second toolbar B2, from which the button 'page rearrangement' has been deleted, is displayed on the display unit 103D.

When the toolbar data is imported, the control unit 101D generates first data and second data (step S28). First data DD1 and the second data DD21 shown in FIG. 8 are examples of the first data and second data generated by the control unit 101D upon the import of the toolbar data.

The first data DD1 includes the identifier of the second toolbar B2 added to the imported toolbar data, an IP address of the terminal apparatus 10D, and date and time at which the toolbar data is imported to the terminal apparatus 10D.

The second data DD21 includes the identifier of the second toolbar B2 added to the imported toolbar data, editing content of the second toolbar B2, a transmission destination of the toolbar data of the edited second toolbar, date and time of import at the transmission destination of the toolbar data of the edited second toolbar, and the like.

The control unit 101D controls the communication unit 105D to transmit a set of the generated first data DD1 and second data DD21 to the terminal apparatus 10B, which is a transmission source of the imported toolbar data (step S24). The communication unit 105B receives the transmitted set of the first data DD1 and second data DD21. The control unit 101B stores the received set of the first data DD1 and second data DD21 in the storage unit 102B (step S25).

Figure 12:
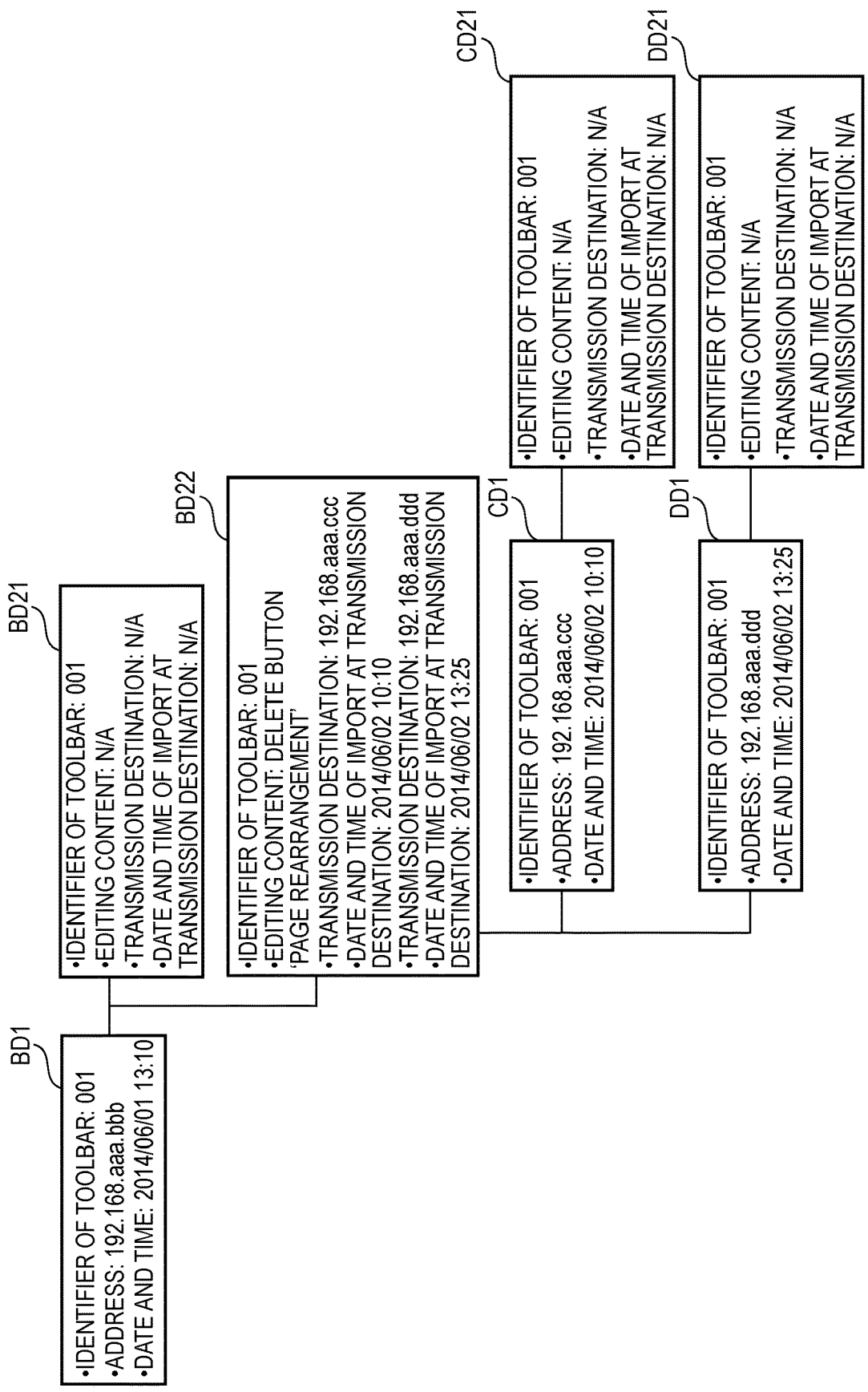
FIG. 12 shows a correlation between the first data and the second data.

When the set of the first data DD1 and second data DD21 is acquired from the terminal apparatus 10D, which is a transmission destination of the toolbar data, the control unit 101B involves the date and time included in the first data DD1 into the second data BD22 including the IP address of the terminal apparatus 10D, as the date and time of import at the transmission destination, as shown in FIG. 12.

Then, the control unit 101B performs correlation of data relating to the second toolbar B2 (step S26). The control unit 101B searches the second data including the same IP address as the IP address of the terminal apparatus 10D included in the acquired first data DD1. Here, since the second data BD22 includes the same IP address as the IP address of the terminal apparatus 10D included in the first data DD1, the set of the first data DD1 and second data DD21 is correlated with the second data BD22. Here, the respective data is correlated as shown in FIG. 12.

When the correlation operation is over, the control unit 101B controls the communication unit 105B to transmit the correlated data to the terminal apparatus 10A, which is a transmission source of the imported toolbar data (step S27). The communication unit 105A receives the correlated data. The control unit 101A specifies the uppermost first data BD1 in the received correlated data, and correlates the management data AD1 having the same identifier as the toolbar identifier included in the first data BD1 with the received correlated data, as shown in FIG. 13 (step S28).

Figure 13:
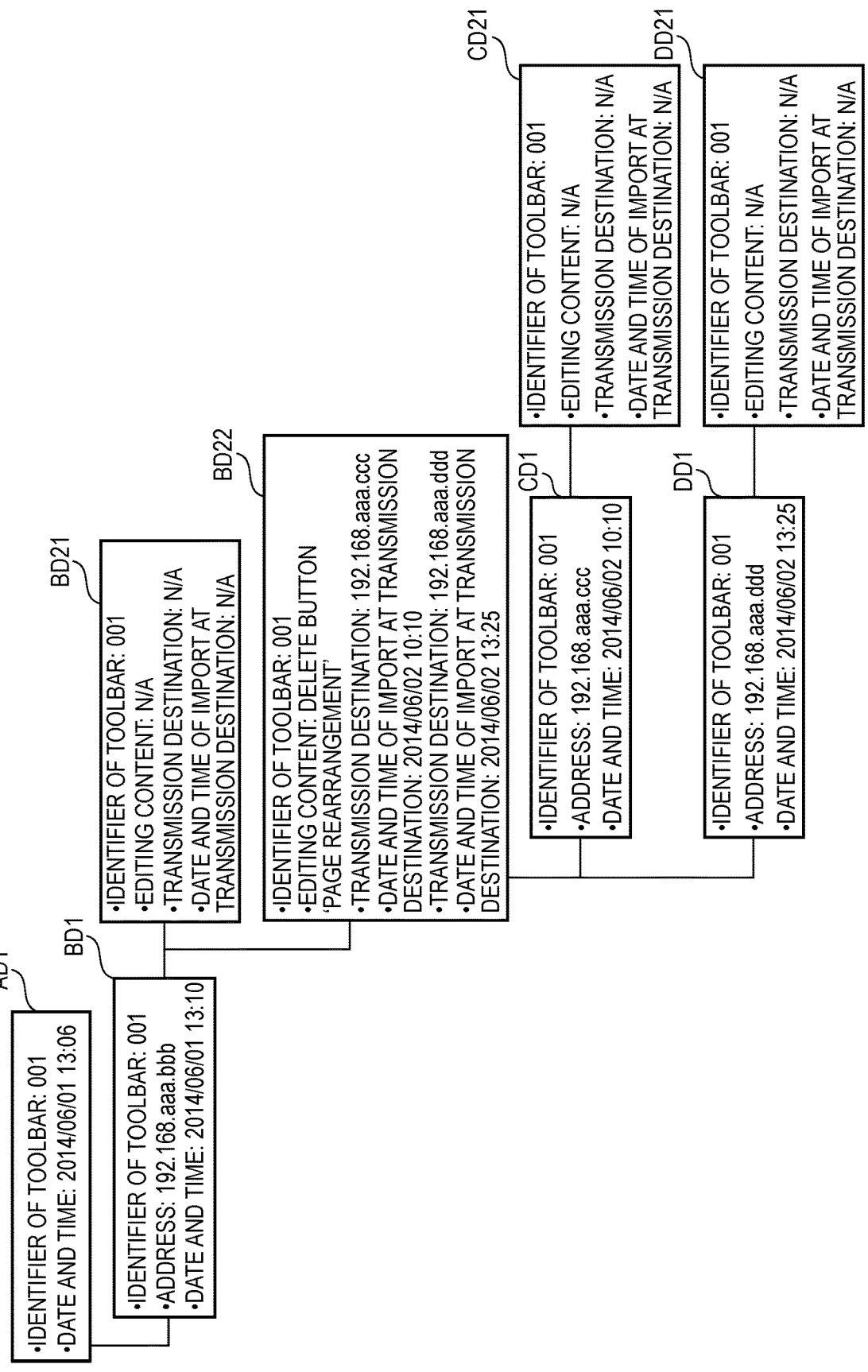
FIG. 13 shows a correlation between the first data and the second data.

When the user A performs an operation of displaying the correlated data, the respective correlated data of FIG. 13 is displayed on the display unit 103A. Here, since the first data CD1 is correlated with the second data BD22, the user A can know that the second toolbar B2 edited at the terminal apparatus 10B is imported to the terminal apparatus 10D, too.

Then, when the user D performs an operation of deleting the button "editing' of the second toolbar B2 displayed by the import on the operation unit 104D, the control unit 101D deletes the button 'editing' from the second toolbar B2 (step S29). Also, when the user D performs an operation of exporting the edited second toolbar B2 on the operation unit 104D, the control unit 101D outputs the toolbar data of the edited second toolbar B2 (step S30).

The identifier of the second toolbar B2 and the identifier of the terminal apparatus 10A, which have been added by the terminal apparatus 10A, and the identifier of the terminal apparatus 10B are added to the toolbar data imported to the terminal apparatus 10D. However, the control unit 101D further adds an identifier (for example, IP address) of the terminal apparatus 10D having output the toolbar data, to the toolbar data to be output here.

When the user D performs an operation of transmitting the output toolbar data to the terminal apparatus 10E, the control unit 101D controls the communication unit 105D to transmit the toolbar data to the terminal apparatus 10E (step S31).

When the output toolbar data is transmitted, the control unit 101D generates second data DD22 including the information relating to the second toolbar B2 (step S32). At this time, since the button has been deleted from a point of time at which the toolbar data was imported, the item of the editing content in the second data DD22 is set as 'deletion of editing button'. Also, since the toolbar data has been transmitted to the terminal apparatus 10E, the transmission destination in the second data DD22 is an IP address of the terminal apparatus 10E. The control unit 101D correlates the generated second data DD22 with the first data DD1.

The communication unit 105E of the terminal apparatus 10E receives the transmitted toolbar data. When a user (hereinafter, referred to as user E) of the terminal apparatus 10E performs an operation of importing the toolbar data on the operation unit 104E at the terminal apparatus 10E in which the document management application is being executed, the control unit 101E executes processing of importing the toolbar data (step S23). When the control unit 101E executes processing of importing the toolbar data, a window having the second toolbar B2, from which the button 'page rearrangement' and the button 'editing' have been deleted, is displayed on the display unit 103E.

When the toolbar data is imported, the control unit 101E generates first data and second data (step S34). First data ED1 and second data ED21 shown in FIG. 8 are examples of the first data and second data generated by the control unit 101E upon the import of the toolbar data.

The first data ED1 includes the identifier of the second toolbar B2 added to the imported toolbar data, an IP address of the terminal apparatus 10E, and date and time at which the toolbar data is imported to the terminal apparatus 10E.

The second data ED21 includes the identifier of the second toolbar B2 added to the imported toolbar data, editing content of the second toolbar B2, a transmission destination of the toolbar data of the edited second toolbar B2, date and time of import at the transmission destination of the toolbar data of the edited second toolbar, and the like. Since the second toolbar B2 has not been edited yet at the terminal apparatus 10E at a point of time at which the toolbar data was imported to the terminal apparatus 10E, an item of the editing content in the second data ED21 is set as 'N/A'. Also, since the second toolbar B2 has not been transmitted yet from the terminal apparatus 10E to the other terminal apparatus 10 at a point of time at which the toolbar data was imported to the terminal apparatus 10E, the transmission destination in the second data ED21 is set as 'N/A'. Also, since the toolbar data has not been transmitted yet from the terminal apparatus 10E to the other terminal apparatus 10 at a point of time at which the toolbar data was imported, the date and time of import in the second data ED21 is set as 'N/A'.

The control unit 101E controls the communication unit 105E to transmit a set of the generated first data ED1 and second data ED21 to the terminal apparatus 10D, which is a transmission source of the imported toolbar data (step S35). The communication unit 105D receives the transmitted set of the first data ED1 and second data ED21. The control unit 101D stores the received set of the first data ED1 and second data ED21 in the storage unit 102D (step S36).

When the set of the first data ED1 and second data ED21 is acquired from the terminal apparatus 10E, which is a transmission destination of the toolbar data, the control unit 101D involves the date and time included in the first data ED1 into the second data DD22 including the IP address of the terminal apparatus 10E, as the date and time of import at the transmission destination, as shown in FIG. 8.

Figure 14:
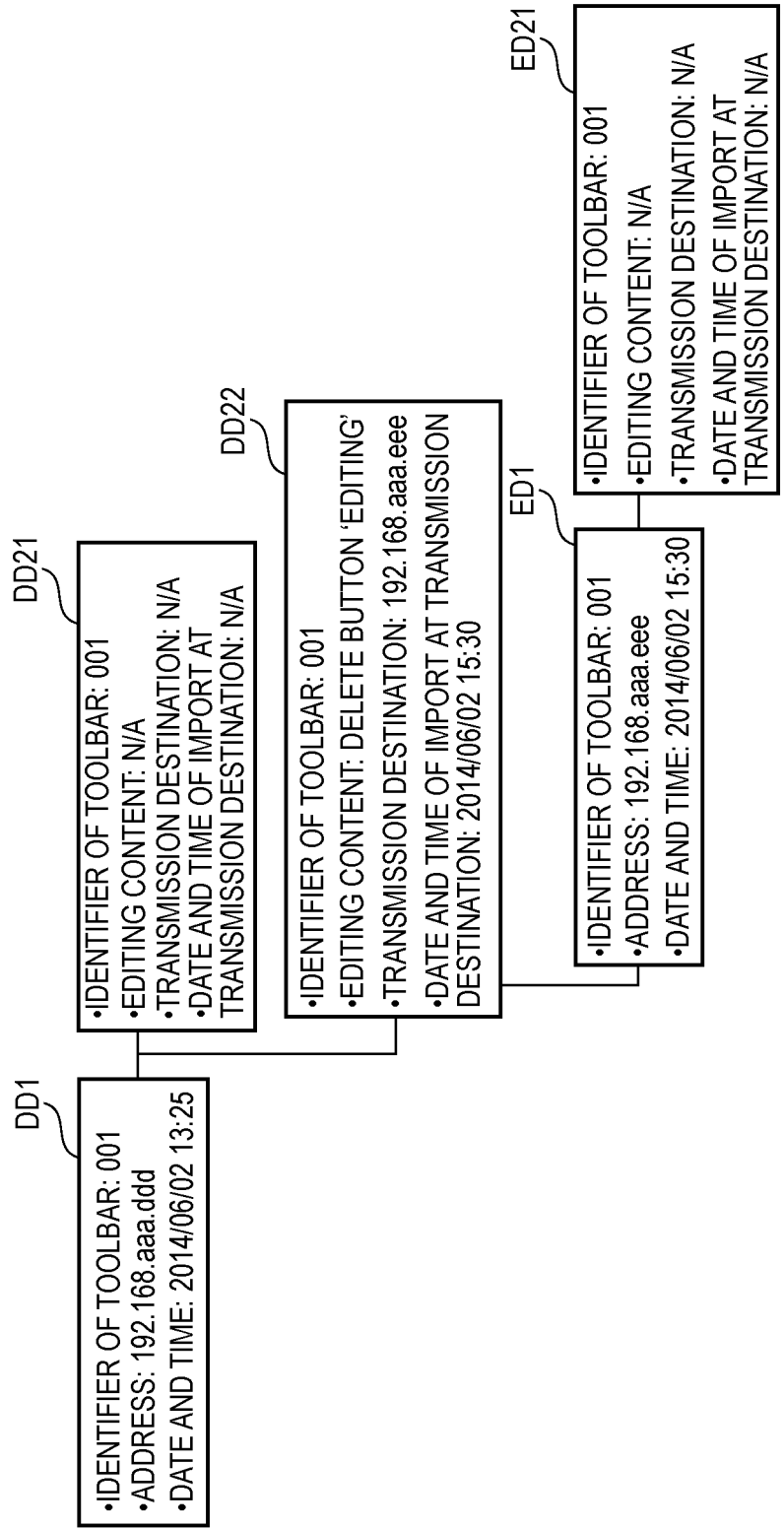
FIG. 14 shows a correlation between the first data and the second data.

Then, the control unit 101D performs correlation of data relating to the second toolbar B2 (step S37). The control unit 101D searches the second data including the same IP address as the IP address of the terminal apparatus 10E included in the acquired first data ED1. Here, since the second data ED22 includes the same IP address as the IP address of the terminal apparatus 10E included in the first data ED1, the set of the first data ED1 and second data ED21 is correlated with the second data DD22. Here, the respective data is correlated as shown in FIG. 14.

When the correlation operation is over, the control unit 101D controls the communication unit 105D to transmit the correlated data to the terminal apparatus 10B, which is a transmission source of the imported toolbar data (step S38). The communication unit 105B receives the correlated data. The control unit 101B stores the acquired data in the storage unit 102B (step S39).

Figure 15:
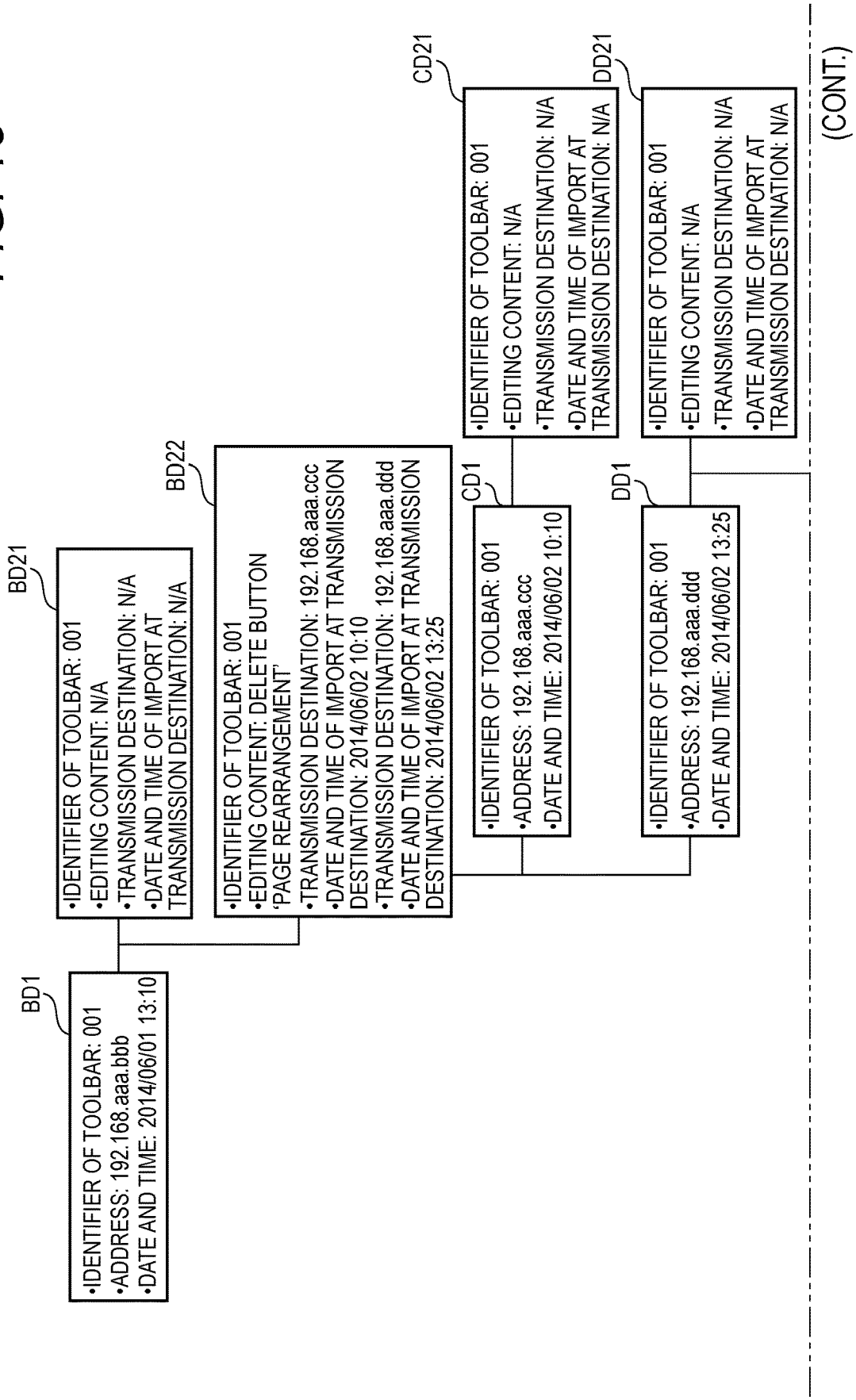
FIG. 15 shows a correlation between the first data and the second data.

Then, the control unit 101B correlates the data relating to the second toolbar B2 (step S40). The control unit 101B specifies the uppermost first data DD1 in the received correlated data, and also specifies the second data including the same IP address as the IP address of the terminal apparatus 10D included in the first data DD1. Here, since the second data BD22 includes the same IP address as the IP address of the terminal apparatus 10D included in the first data DD1, the control unit 101B correlates the received correlated data with the second data BD22. Here, the respective data is correlated at the terminal apparatus 10B, as shown in FIG. 15.

When the correlation operation is over, the control unit 101B controls the communication unit 105B to transmit the correlated data to the terminal apparatus 10A, which is a transmission source of the imported toolbar data (step S41). The communication unit 105A receives the correlated data. The control unit 101A specifies the uppermost first data BD1 in the received correlated data, and correlates the management data AD1 having the same identifier as the toolbar identifier included in the first data BD1 with the received correlated data, as shown in FIG. 16 (step S42).

Figure 16:
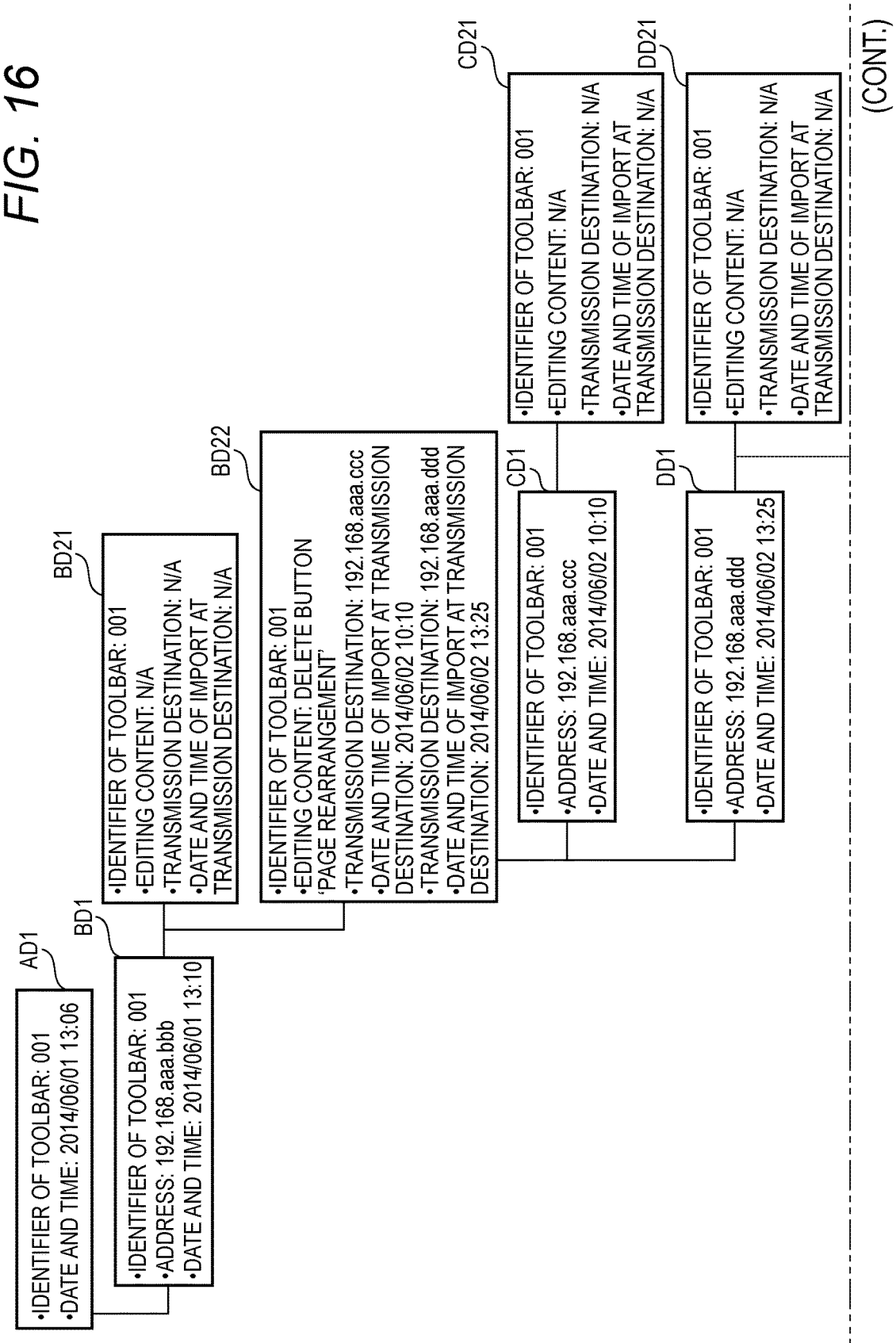
FIG. 16 shows a correlation between the first data and the second data.

When the user A performs an operation of displaying the correlated data, the respective correlated data of FIG. 16 is displayed on the display unit 103A. Here, since the first data ED1 is correlated with the second data DD22, the user A can know that the second toolbar B2 edited at the terminal apparatus 10D is imported at the terminal apparatus 10E.

Also, when the second toolbar B2 is transmitted to the plurality of terminal apparatuses 10, the user A who is a distribution source of the second toolbar B2 can know situations of the second toolbar B2 at the plurality of other terminal apparatuses 10.

Also, the user A can know a situation of the second toolbar B2 at the terminal apparatus 10D or terminal apparatus 10E even when the user A does not know the IP address of the terminal apparatus 10D or terminal apparatus 10E to which the second toolbar B2 is secondarily distributed. Also, since the first data and the second data are transmitted from the terminal apparatus to the other terminal apparatus, it is possible to know the hysteresis of the processing relating to the second toolbar B2, without via a server apparatus.

Modified Embodiments

Although the first illustrative embodiment of the present invention has been described, the present invention is not limited to the above illustrative embodiment and can be implemented in diverse forms. For example, the present invention may be implemented by modifying the above illustrative embodiment as follows. In the meantime, the first illustrative embodiment and the following modified embodiments may be respectively combined.

Figure 17:
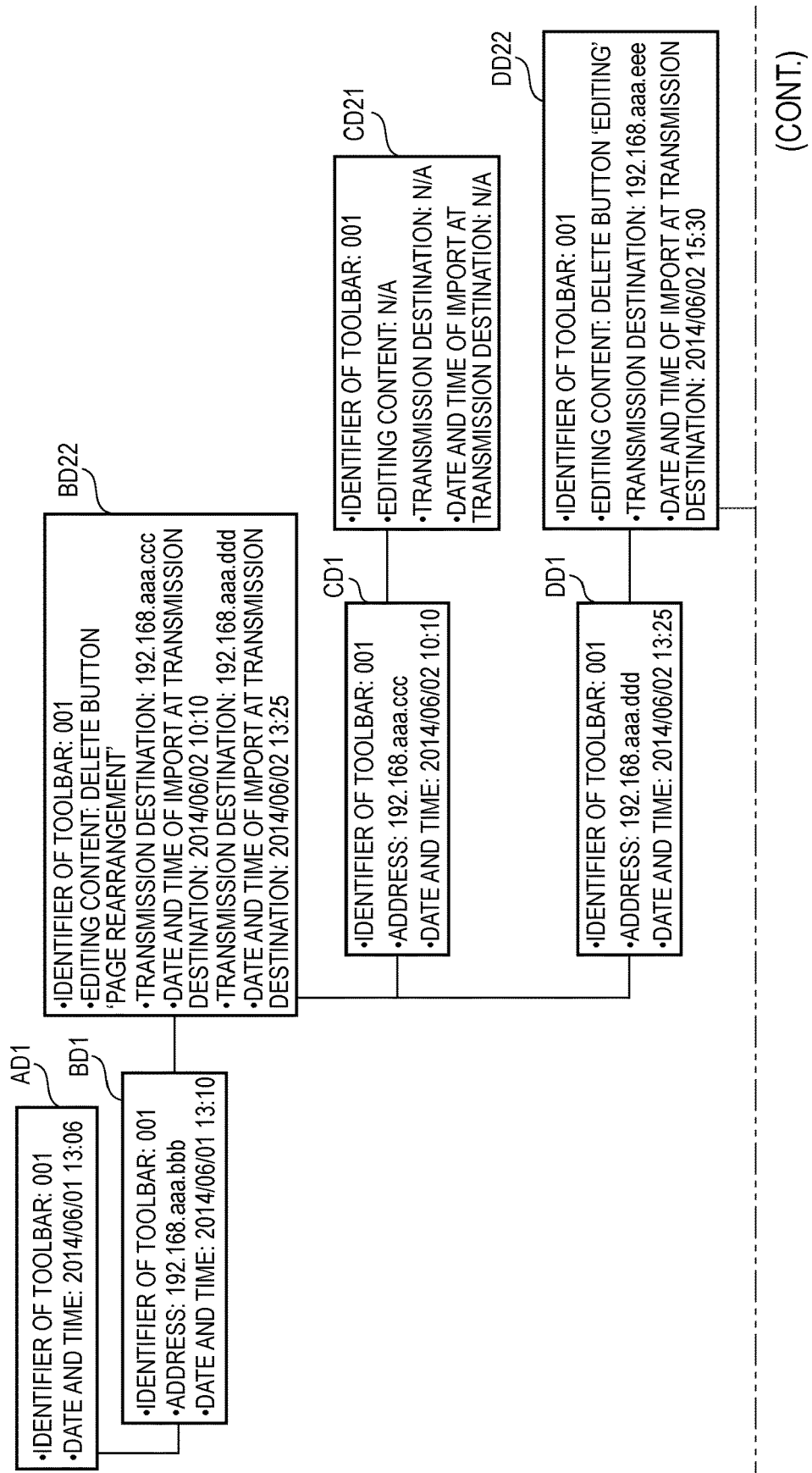
FIG. 17 shows a correlation between the first data and the second data in a modified embodiment.

In the above first illustrative embodiment, when one terminal apparatus 10 generates a plurality of second data, the plurality of generated second data is displayed with being correlated with the first data. However, the present invention is not limited thereto. For example, although the generated second data BD21 and second data BD22 are displayed with being correlated with the first data BD1 at the terminal apparatus 10B, the second data BD21 to which the first data of the transmission destination is not correlated may not be displayed at the terminal apparatus 10A, as shown in FIG. 17. Also, although the generated second data DD21 and second data DD22 are displayed with being correlated with the first data DD1 at the terminal apparatus 10D, the second data DD21 to which the first data of the transmission destination is not correlated may not be displayed at the terminal apparatus 10A.

In the above first illustrative embodiment, when displaying the correlated first data and second data, if the editing content of the second data is 'N/A' in the set of the second data and the first data correlated to a downstream of the second data, the terminal apparatus 10 having generated the correlated downstream data and the terminal apparatus 10 having generated the correlated upstream data use the second toolbar B2 having the same content. In this case, the terminal apparatus 10A may be configured to display the correlated upstream data and downstream data by setting background colors in frames with the same color.

For example, when displaying the data correlated as shown in FIG. 17, the terminal apparatus 10A may display the first data BD1, the second data BD22, the first data CD1 and the second data CD21 by setting character backgrounds in frames with blue and may display the first data DD1, the second data DD22, the first data ED1 and the second data ED21 by setting character backgrounds in frames with red.

In the above first illustrative embodiment, when the terminal apparatus 10 displays the correlated data, it displays the first data and the second data. However, the present invention is not limited thereto. For example, as shown in FIG. 18, the first data may be correlated with each other and displayed without displaying the second data.

Figure 18:
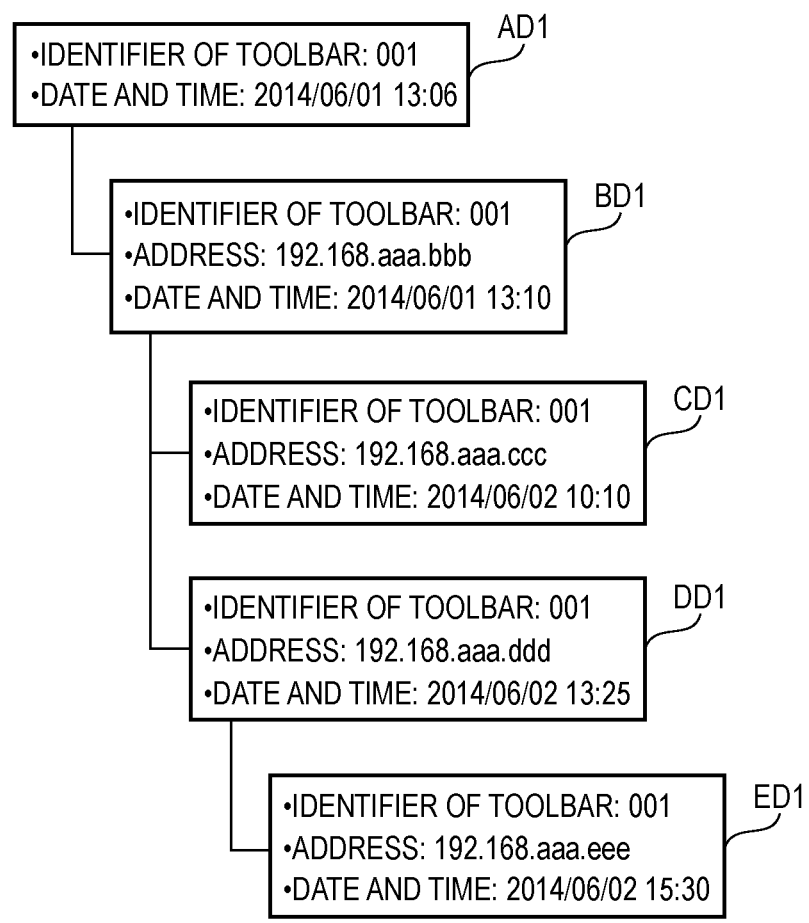
FIG. 18 shows a correlation of the first data in a modified embodiment.
Figure 19:
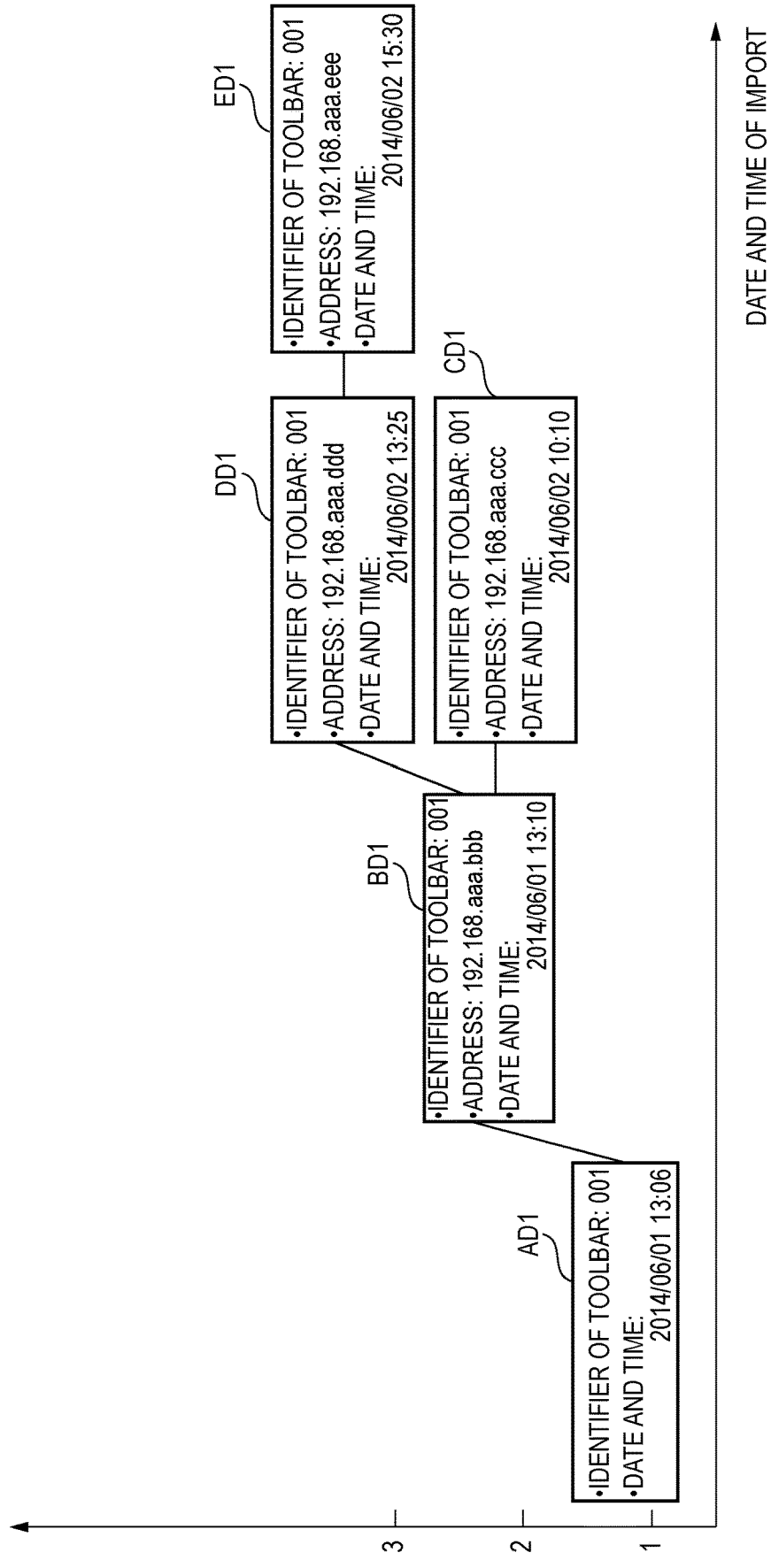
FIG. 19 shows a correlation between the first data and the second data.

Also, when displaying the correlated data at the terminal apparatus 10 without displaying the second data, the display aspect is not limited to FIG. 18 and the other display aspects are also possible. For example, it is possible to know that the second toolbar B2 is edited twice and that there are three types of the second toolbar B2 of the terminal apparatus 10A, the second toolbar B2 from which the button 'page rearrangement' has been deleted and the second toolbar B2 from which the button 'page rearrangement' and the button 'editing' have been deleted, from the contents of the second data BD22 and second data DD22. The terminal apparatus 10A may be configured to analyze the correlated data and to display a graph in which a horizontal axis indicates date and time of import of the second toolbar, a vertical axis indicates a number of types of the second toolbar and the first data is arranged and displayed depending on date and time of registration and a number of editing times.

In the above first illustrative embodiment, the terminal apparatus 10 having received the toolbar data is configured to transmit the generated first data and second data and the correlated data to the terminal apparatus 10, which is a transmission source of the toolbar data. However, for example, when there occurs a failure in communication with the transmission source of the toolbar data, the data is not transmitted to the transmission source of the toolbar data.

In this case, the terminal apparatus 10 may be configured to refer to the IP address of the terminal apparatus 10 added to the toolbar data, thereby transmitting the first data and second data and the correlated data to the other terminal apparatus 10 having transmitted the toolbar data.

For example, when it is not possible to transmit the set of the generated first data DD1 and second data DD21 to the terminal apparatus 10B, the terminal apparatus 10D transmits the set of the generated first data DD1 and second data DD21 to the terminal apparatus 10A.

Also, for example, when it is not possible to transmit the set of the generated first data ED1 and second data ED21 to the terminal apparatus 10D, the terminal apparatus 10E may transmit the set of the generated first data ED1 and second data ED21 to the terminal apparatus 10B, and when it is not possible to transmit the same to the terminal apparatus 10B, too, the terminal apparatus 10E may transmit the same to the terminal apparatus 10A.

In the above first illustrative embodiment, when the toolbar data is imported at the terminal apparatus 10, the set of the first data and the second data and the correlated data are transmitted to the other terminal apparatus 10. However, the present invention is not limited thereto. For example, when the second toolbar B2 is edited, the second data may be generated and the set of the first data and second data may be transmitted to the terminal apparatus 10, which is a transmission source of the toolbar.

In the above first illustrative embodiment, when the second toolbar B2 has a plurality of tab bars, the export or import may be performed with the arrangement order of the respective tab bars being included and a variety of data or information for obtaining the hysteresis of the processing relating to the second toolbar B2 may be transmitted and received.

The program of each apparatus may be provided with being recorded in a computer-readable recording medium such as a magnetic recording medium (magnetic tape, magnetic disk (HDD (Hard Disk Drive), FD (Flexible Disk) and the like), an optical recording medium (optical disk and the like), an optical magnetic recording medium, a semiconductor memory and the like and then installed. Also, the program may be downloaded and installed through a communication line.

Second Illustrative Embodiment

Figure 20:
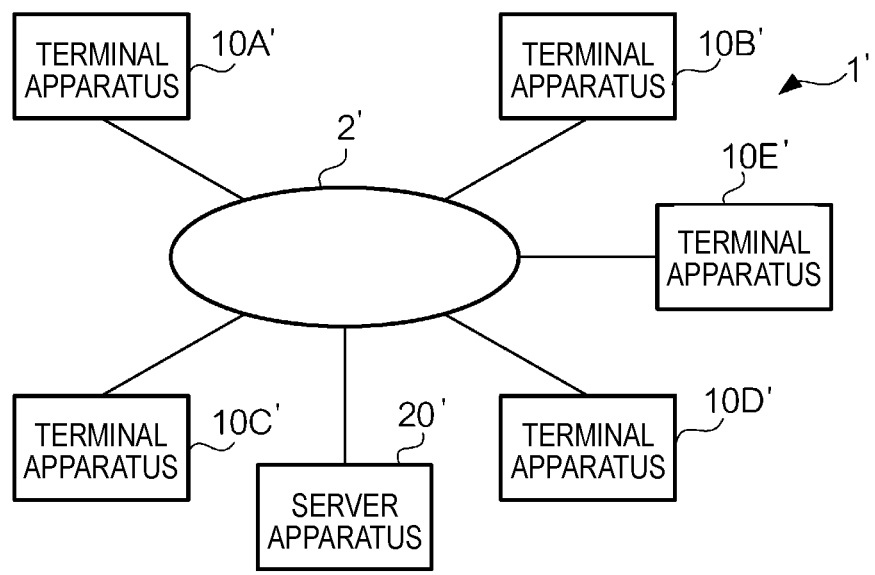
FIG. 20 shows apparatuses relating to a communication system 1 according to a second illustrative embodiment of the present invention.

FIG. 20 shows apparatuses relating to a communication system 1' according to a second illustrative embodiment of the present invention. A communication line 2' is a LAN (Local Area Network) through which data communication is performed, and a plurality of computer apparatuses configured to perform data communication is connected thereto. The communication line 2' is not limited to the LAN, and may include a communication line through which the computer apparatus performs communication, such as WAN (Wide Area Network), Internet and telephone line. Terminal apparatuses 10A' to 10E' are apparatuses configured to perform data communication, and are so-called PCs in this second illustrative embodiment. The terminal apparatuses 10A' to 10E' are connected to the communication line 2' and are configured to perform data communication through the communication line 2'. In this second illustrative embodiment, since the terminal apparatuses 10A' to 10E' have the same hardware configuration, they are simply referred to as 'terminal apparatus 10'' when it is not necessary to distinguish the same.

A server apparatus 20' is a computer apparatus configured to perform communication with the terminal apparatus 10'. The server apparatus 20' is an example of an analysis apparatus configured to acquire data transmitted from the terminal apparatuses 10A' to 10E' and to analyze the acquired data.

(Configuration of Terminal Apparatus 10')

Figure 21:
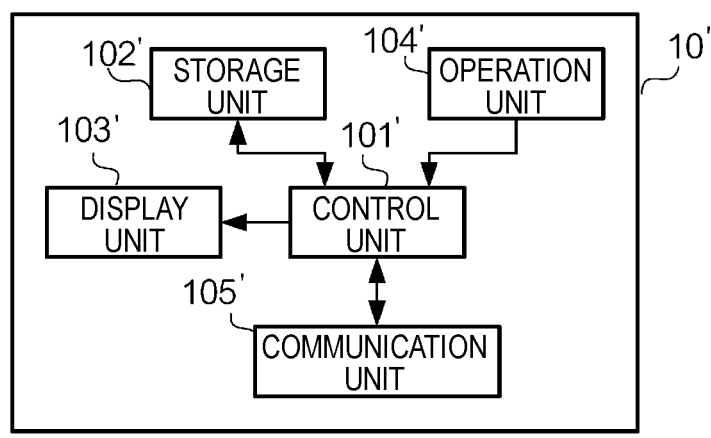
FIG. 21 is a block diagram showing a hardware configuration of a terminal apparatus 10.

FIG. 21 shows an example of the hardware configuration of the terminal apparatus 10'. A display unit 103' has a display device and is configured to display a variety of screens for operating the terminal apparatus 10'. An operation unit 104' has an input device for operating the terminal apparatus 10', such as a keyboard and a mouse. A communication unit 105' functions as a communication interface for performing data communication.

A storage unit 102' has a device (for example, a hard disk drive) for permanently storing therein data, and is configured to store therein a program of an operating system, an application program, a document file indicating a document, and the like. In this second illustrative embodiment, the storage unit 102' is configured to store therein an application program (hereinafter, referred to as document management application) for implementing functions of displaying, editing and managing a document file, and the like.

A control unit 101' has a CPU (Central Processing Unit) and a RAM (Random Access Memory) and is configured to execute the program of the operating system and the application program. When the CPU executes the document management application, the functions of displaying, editing and managing a document file, a function of recording an operation hysteresis indicating a hysteresis of operations of the document management application, and the like are implemented.

Figure 22:
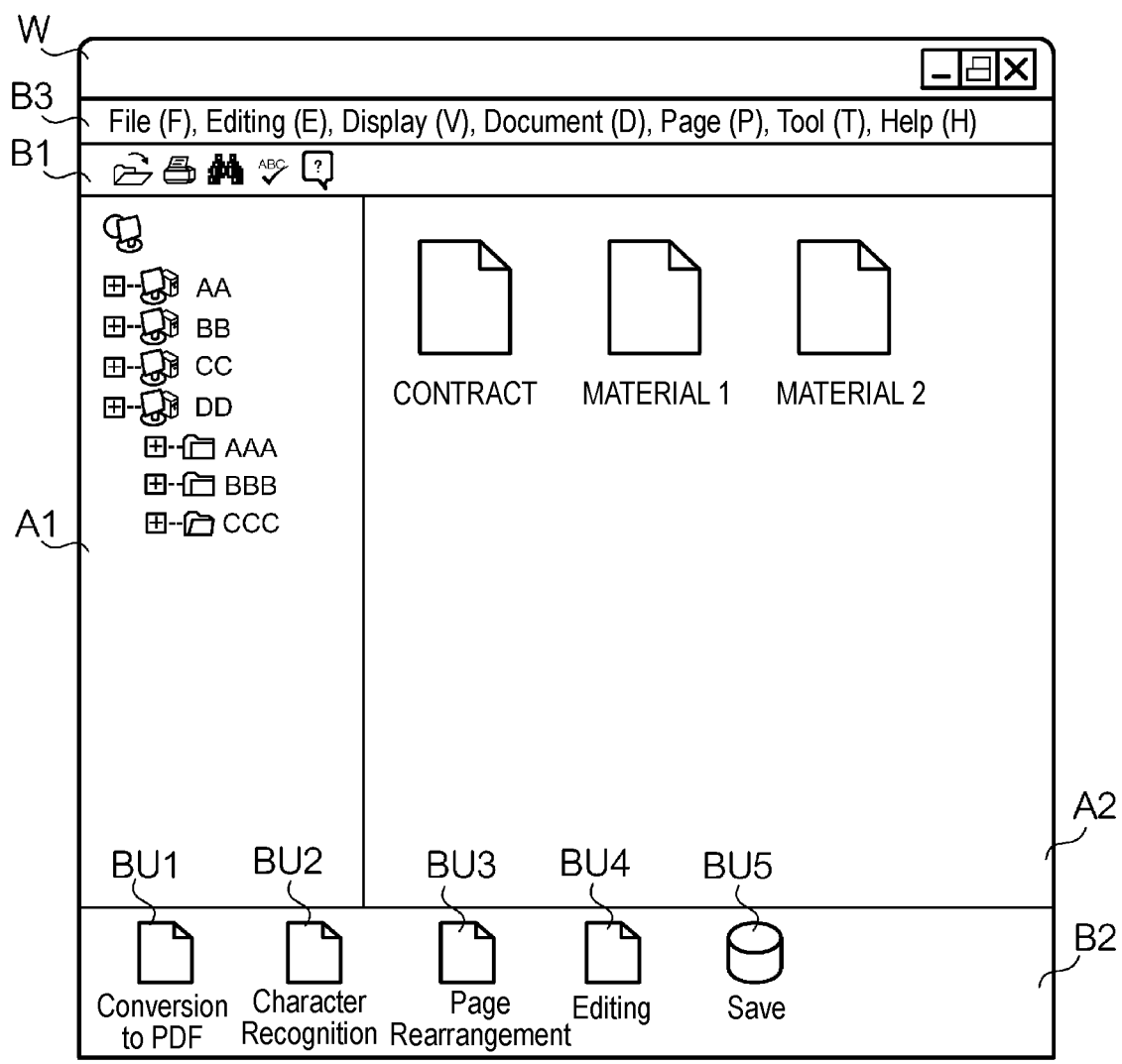
FIG. 22 illustrates an example of a GUI configured to be displayed on the terminal apparatus 10.

FIG. 22 illustrates an example of a GUI (Graphical User Interface) that is displayed on the display unit 103' as the document management application is executed. The GUI has, in a window W, a menu bar B3, a first toolbar B1 on which button icons (an example of an image) corresponding to predetermined functions are arranged, a second toolbar B2 on which an editing of adding, deleting and arranging a button icon corresponding to a function can be performed by a user's operation, a first display area A1 configured to display a folder tree and a second display area A2 configured to display a document. The second toolbar B2 is an example of a display area of an image corresponding to a function. In this second illustrative embodiment, an icon is displayed on the second toolbar B2, as an image corresponding to a function. However, as the image corresponding to a function, an object, a character or a combination of an object, a character and an icon may also be used.

Figure 23:
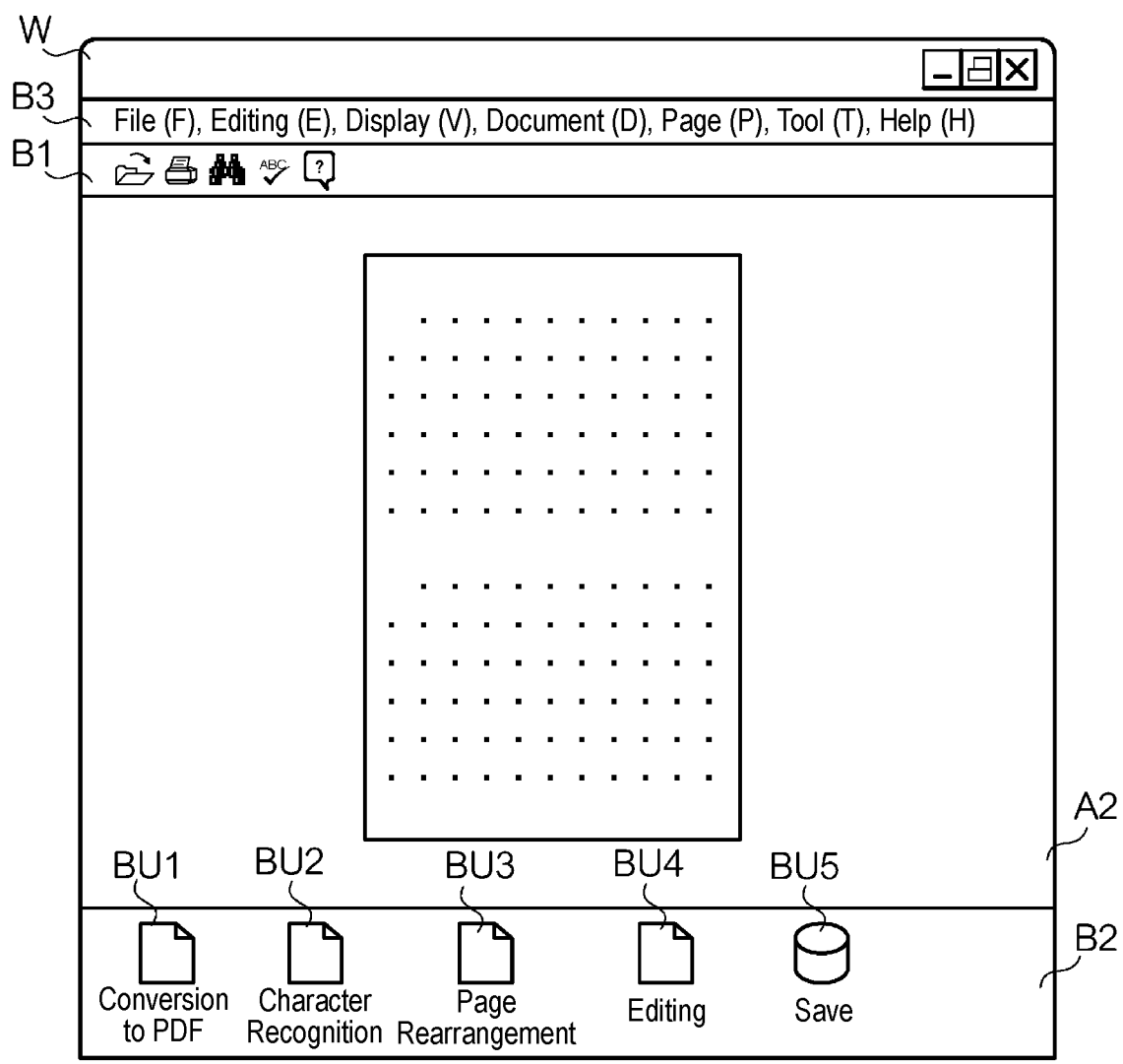
FIG. 23 illustrates an example of a GUI configured to be displayed on the terminal apparatus 10.

When a user selects a folder in the first display area A1, files in the folder are displayed in an icon form in the second display area A2, as shown in FIG. 22. When the user performs an operation of selecting an icon displayed in the second display area A2 to open a file, a content of the file is displayed as shown in FIG. 23.

The second toolbar B2 is an example of a distinguishing toolbar of the present invention. When the user operates the operation unit 104', the control unit 101' adds, deletes or rearranges a button on the second toolbar B2, in response to the operation on the operation unit 104'. When the user performs an operation of pressing a button displayed on the second toolbar B2 on the operation unit 104', the control unit 101' executes a function corresponding to the button.

For example, when performing a series of operations of converting an image file of a document read by a scanner into a PDF (Portable Document Format), performing character recognition for the PDF file to generate text data, rearranging pages of the document, editing the text data of the document and saving the edited document file, if a button BU1 'conversion to PDF' corresponding to a function of converting an image file to a PDF, a button BU2 'character recognition' corresponding to a function of character recognition, a button BU3 'page rearrangement' corresponding to a function of rearranging a page, a button BU4 'editing' corresponding to a function of editing text data and a button BU5 'save' corresponding to a function of saving a file are arranged from left in conformity of the operation sequence, as shown in FIG. 22, it is possible to execute the series of operations in order.

Also, the second toolbar B2 is configured to be exported and imported, in response to a user's operation. When the user performs an operation of exporting the second toolbar B2 on the operation unit 104', the control unit 101' outputs toolbar data indicating the second toolbar B2. Also, when the user performs an operation of importing toolbar data on the operation unit 104', the control unit 101' arranges a variety of buttons in an area of the second toolbar B2, in response to a content of the toolbar data.

By transmitting the output toolbar data to the other terminal apparatus 10' and importing the same at the other apparatus 10', the same second toolbar B2 as the terminal apparatus 10' having transmitted the toolbar data is displayed on the other terminal apparatus 10', too. For example, when a user (hereinafter, referred to as user A) of the terminal apparatus 10A' asks a user (hereinafter, referred to as user B) of the terminal apparatus 10B' to work as the content of the second toolbar B2 shown in FIG. 33, the user A exports the second toolbar B2 and transmits the toolbar data to the terminal apparatus 10B'. When the user B imports the transmitted toolbar data at the terminal apparatus 10B', the user B can perform a series of operations in order with the second toolbar B2 set by the user A. In the meantime, since the toolbar data can be transmitted to the terminal apparatus 10' of another user, the toolbar data transmitted from the terminal apparatus 10A' can be transmitted from the terminal apparatus 10B' to the terminal apparatus 10C' or terminal apparatus 10D' and can be further transmitted from the terminal apparatus 10D' to the terminal apparatus 10E', for example.

Since the respective buttons are arranged in order of operations on the second toolbar B2 imported to the terminal apparatus 10', the respective buttons are preferably operated in order of the arranged buttons. However, some users of the terminal apparatus 10' may not operate the buttons in order of the arranged buttons on the imported second toolbar B2.

Therefore, the terminal apparatus 10' of this second illustrative embodiment has a function of perceiving whether the second toolbar B2 is operated in order of the arranged buttons. Specifically, the document management application has a function of recording an operation hysteresis of the second toolbar B2. When recording an operation hysteresis of the second toolbar B2, a preparer of the second toolbar B2 arranges a START button BUS and an END button BUE on the second toolbar B2, as exemplified in FIG. 24. When an operation of pressing the START button BUS is performed, the control unit 101' executing the document management application starts to record a button operation hysteresis of the second toolbar B2. Also, when an operation of pressing the END button BUE is performed, the control unit 101' executing the document management application ends the recording of the button operation hysteresis. Also, the document management application has functions of analyzing the recorded operation hysteresis and transmitting data obtained through the analysis of the operation hysteresis to the server apparatus 20' when an operation different from an order of the arranged buttons on the second toolbar B2 is performed.

(Functional Configuration of Terminal Apparatus 10')

Figure 25:
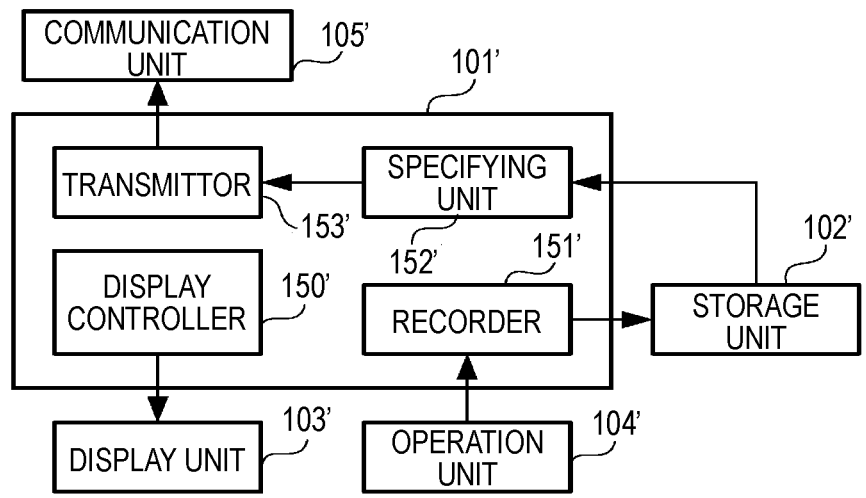
FIG. 25 is a functional block diagram of the terminal apparatus 10.

FIG. 25 is a functional block diagram showing a configuration of a distinguishing function of the present invention of the functions of the terminal apparatus 10', which are implemented as the document management application is executed.

A display controller 150' is to control the display unit 103' and to display a screen of a GUI on the display unit 103'. The display controller 150' controls the display unit 103' to display the second toolbar B2 in a window.

A recorder 151' is to record a hysteresis of an operation performed for the button of the second toolbar B2 on the operation unit 104' in the storage unit 102'.

A specifying unit 152' is to analyze the operation hysteresis recorded in the storage unit 102' and to specify an operation hysteresis of a button for which an operation different from a predetermined operation is performed on the second toolbar B2.

A transmitter 153' is to control the communication unit 105' to transmit the operation hysteresis (an example of the information indicating that a user's operation is different from a predetermined operation) specified by the specifying unit 152' to the server apparatus 20'.

(Configuration of Server Apparatus 20')

Figure 26:
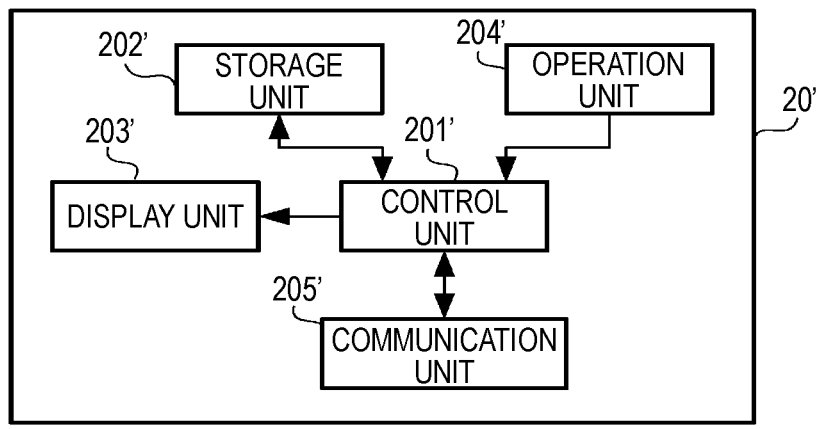
FIG. 26 is a block diagram showing a hardware configuration of a server apparatus 20.

FIG. 26 shows an example of a hardware configuration of the server apparatus 20'. A communication unit 205' functions as a communication interface for performing data communication and is connected to the communication line 2'. The server apparatus 20' is configured to control the communication unit 205' to perform communication with the terminal apparatus 10'. A display unit 203' has a display device. The display unit 203' is configured to display a variety of screens for operating the server apparatus 20', data transmitted from the terminal apparatus 10', and the like. An operation unit 204' has an input device for operating the server apparatus 20', such as a keyboard and a mouse.

A storage unit 202' has a device (for example, a hard disk drive) for permanently storing therein data, and is configured to record therein data transmitted from the terminal apparatus 10'. Also, the storage unit 202' is configured to store therein a program for implementing functions of performing communication with the terminal apparatus 10', recording data transmitted from the terminal apparatus 10', analyzing data transmitted from the terminal apparatus 10', transmitting an analysis result to the terminal apparatus 10', and the like. A control unit 201' has a CPU and a RAM and is configured to control the storage unit 202' and the communication unit 205'. When the CPU executes the program stored in the storage unit 202', the above functions are implemented.

(Functional Configuration of Server Apparatus 20')

Figure 27:
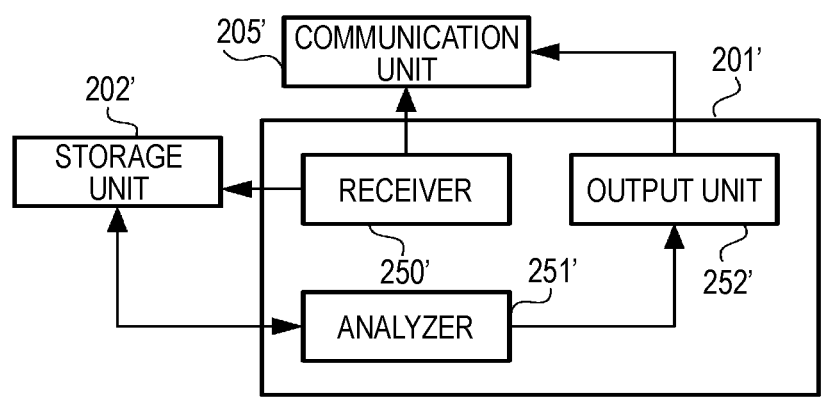
FIG. 27 is a functional block diagram of the server apparatus 20.

FIG. 27 is a functional block diagram showing a configuration of a distinguishing function of the present invention of the functions that are implemented in the server apparatus 20'.

A receiver 250' is to control the communication unit 205' to receive the operation hysteresis transmitted by the terminal apparatus 10'. The operation hysteresis received by the receiver 250' is recorded in the storage unit 202'.

An analyzer 251' is to analyze a user's operation performed for the second toolbar B2, based on the operation hysteresis received by the receiver 250' and recorded in the storage unit 202'.

An output unit 252' is to control the communication unit 205' to output an analysis result of the analyzer 251' to the terminal apparatus 10'.

Example of Operation of Second Illustrative Embodiment

Subsequently, an example of an operation of this second illustrative embodiment is described. In the example of the operation, a case is exemplified in which the second toolbar B2 of FIG. 24 prepared at the terminal apparatus 10A' by the user A is imported to the terminal apparatuses 10A' to 10E' and the imported second toolbar B2 is operated at the terminal apparatuses 10A' to 10E'. In below descriptions, when it is necessary to distinguish the hardware configurations and functional configurations of the respective terminal apparatuses 10', the respective units of the terminal apparatus 10A' are denoted with the corresponding reference numerals having 'A" attached to an end thereof, the respective units of the terminal apparatus 10B' are denoted with the corresponding reference numerals having 'B" attached to an end thereof, the respective units of the terminal apparatus 10C' are denoted with the corresponding reference numerals having 'C" attached to an end thereof, the respective units of the terminal apparatus 10D' are denoted with the corresponding reference numerals having 'D'" attached to an end thereof and the respective units of the terminal apparatus 10E' are denoted with the corresponding reference numerals having 'E'' attached to an end thereof, for convenience of explanations.

When the user A asks the users of the terminal apparatuses 10A' to 10E' to perform a series of operations of conversion of an image file into a PDF, character recognition, page rearrangement, editing of text data, save of a document file, and the like, the user A operates the operation unit 104A' to arrange the buttons BU1 to BU5 in corresponding order from left on the second toolbar B2. Also, when the user A wants to perceive whether the second toolbar B2 is operated in order of the arranged buttons, the user A arranges the START button BUS and the END button BUE on the second toolbar B2, as exemplified in FIG. 24.

Figure 24:
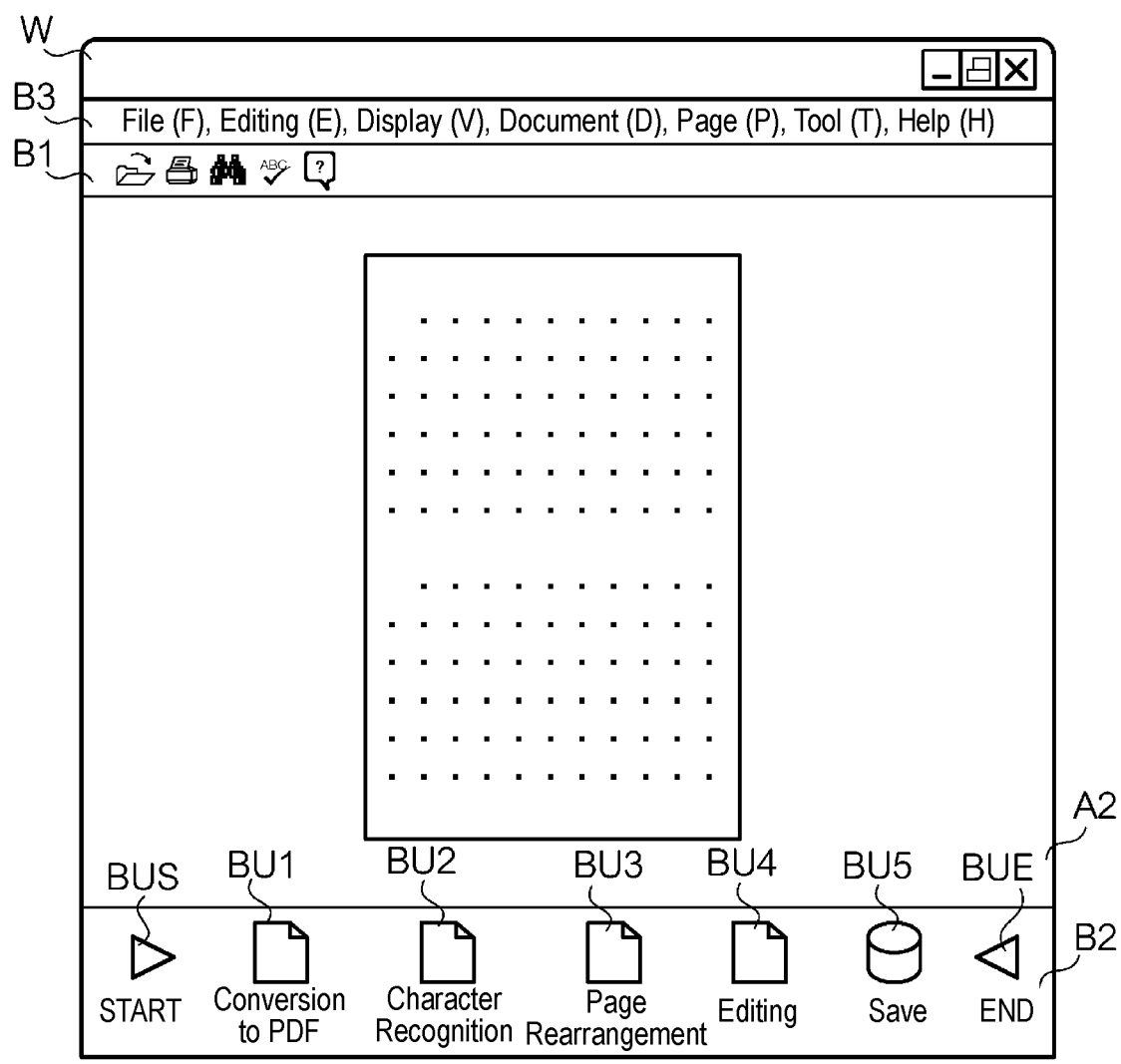
FIG. 24 illustrates an example of a GUI configured to be displayed on the terminal apparatus 10.

When the user A performs an operation of exporting the second toolbar B2 of FIG. 24 on the operation unit 104A' at the terminal apparatus 10A' in which the document management application is being executed, the control unit 101A' outputs toolbar data, in response to the performed operation (FIG. 28: step P1). When exporting the newly prepared second toolbar B2, the control unit 101A' adds a toolbar identifier for identifying the second toolbar B2 to the toolbar data to be output here.

When the user A performs an operation of transmitting the output toolbar data to the terminal apparatus 10B', the control unit 101A' controls the communication unit 105A' to transmit the toolbar data to the terminal apparatus 10B' (step P2). Also, when the user A performs the operation of transmitting the output toolbar data to the terminal apparatuses 10C' to 10E', the control unit 101A' controls the communication unit 105A' to transmit the toolbar data to the terminal apparatuses 10C' to 10E' (steps P3 to P5).

The communication unit 105B' of the terminal apparatus 10B' receives the toolbar data transmitted from the terminal apparatus 10A'. When the user B performs an operation of importing the toolbar data on the operation unit 104B at the terminal apparatus 10B' in which the document management application is being executed, the control unit 101B' executes processing of importing the toolbar data (step P6). When the control unit 101B' executes processing of importing the toolbar data, a window having the second toolbar B2 of FIG. 24 is displayed on the display unit 103B'. Also, when the users perform an operation of importing the toolbar data at the terminal apparatuses 10C' to 10E', like the user B, the processing of importing the toolbar data is executed (steps P6 to P9) and a window having the second toolbar B2 of FIG. 24 is displayed on the display unit 103'.

At the terminal apparatuses 10B' to 10E' on which the second toolbar B2 is displayed, the user operates the second toolbar B2 to edit a document file (steps P10 to P13). Specifically, the user first performs an operation of pressing the START button BUS of the second toolbar B2. When the START button BUS is pressed, the control unit 101' starts to record an operation hysteresis of the buttons of the second toolbar B2.

Then, when the user performs an operation of pressing a button between the START button BUS and the END button BUE on the operation unit 104' so as to process the document file, the control unit 101' associates a button name of the pressed button and a number, which indicates what number the button is pressed after the START button BUS is pressed, and records the same in the storage unit 102', as the operation hysteresis.

For example, when the user B first operates the second toolbar B2, if the user B operates the buttons in order of the button BU1, the button BU3, the button BU2, the button BU4 and the button BU5, a button name 'PDF preparation' is associated with '1', a button name 'page rearrangement' is associated with '2', a button name 'character recognition' is associated with '3', a button name 'editing' is associated with '4', and a button name 'save' is associated with '5', as shown at a first line of a record of FIG. 29, for example. That is, the operated orders of the respective buttons are stored with being associated with the button names. Also, when the user B operates the second toolbar B2 secondarily, if the user B operates the buttons in order of the button BU1, the button BU2, the button BU4, the button BU3 and the button BU5, the operation hysteresis is recorded, as shown at a second line of the record of FIG. 29. When the user B operates the second toolbar B2 thirdly, if the user B operates the buttons in order of the button BU1, the button BU3, the button BU2, the button BU4 and the button BU5, the operation hysteresis is recorded, as shown at a third line of the record of FIG. 29.

The user of the terminal apparatuses 10B' to 10E' operates the buttons BU1 to BU5 to perform an operation relating to the second toolbar B2. When the operation relating to the second toolbar B2 is over, the user performs an operation of pressing the END button BUE of the second toolbar B2. When the operation of pressing the END button BUE is performed, the control unit 101' of the terminal apparatuses 10B' to 10E' ends the recording of the operation hysteresis of the buttons of the second toolbar B2.

When the operation of pressing the END button BUE is performed, the control unit 101' of the terminal apparatuses 10B' to 10E' analyzes the recorded recording hysteresis and specifies an operation hysteresis, which is made when the operation has not been performed in order of the arranged buttons on the second toolbar B2 (steps P14 to P17). Specifically, the control unit 101' first acquires, as data included in the toolbar data, data (hereinafter, referred to as operation sequence data) in which names of the buttons and arranging orders of the buttons are associated with each other with respect to the buttons between the START button BUS and the END button BUE, as exemplified in FIG. 30. The control unit 101' compares the operation hysteresis and the operation sequence data and specifies an operation hysteresis, which is made when the operation has not been performed in order of the operation sequence data.

For example, comparing the first line of the record shown in FIG. 29 and the operation sequence data of FIG. 30, the operated orders of the button BU2 'character recognition' and the button BU3 'page rearrangement' are different from each other. Therefore, the control unit 101' specifies the first line of the record shown in FIG. 29, as the operation hysteresis made when the operation has not been performed in order of the arranged buttons on the second toolbar B2.

When the operation of specifying the operation hysteresis, which is made when the operation has not been performed in order of the operation sequence data, is over, the control unit 101' transmits data of the specified operation hysteresis, a user name of the user of the terminal apparatus 10', and the toolbar identifier added to the toolbar data of the second toolbar B2 to the server apparatus 20' (steps P18 to P21). In the meantime, as the user name to be transmitted, a user name that is input when the user logs in the terminal apparatus 10' is used.

When the operation hysteresis, the user name and the toolbar identifier transmitted from the terminal apparatuses 10B' to 10E' are received, the control unit 201' of the server apparatus 20' associates the received data and records the same in the storage unit 202' (step P22).

When the user A having prepared the second toolbar B2 wants to obtain an analysis result of the operation performed for the distributed second toolbar B2, the user A performs an operation of logging in the server apparatus 20' on the operation unit 104A' (step P23).

When the user A logs in the server apparatus 20', the user A performs operations of inputting the toolbar identifier of the prepared second toolbar B2 and acquiring an analysis result of the operation performed for the second toolbar B2 on the operation unit 104A'. When the operations of inputting the toolbar identifier and acquiring an analysis result are performed, the control unit 101A' controls the communication unit 105A' to transmit a message requesting an analysis result, including the input toolbar identifier, to the server apparatus 20' (step P24).

When the communication unit 205' receives the message requesting an analysis result, the control unit 201' acquires the toolbar identifier included in the received message and analyzes the operation hysteresis recorded with being associated with the acquired toolbar identifier (step P25). Specifically, the control unit 201' acquires, from the storage unit 202', data (hereinafter, referred to as operation sequence data) in which names of the buttons and arranging orders of the buttons are associated with each other with respect to the buttons between the START button BUS and the END button BUE, as exemplified in FIG. 30. The control unit 201' compares the operation hysteresis associated with the acquired toolbar identifier and the operation sequence data and specifies a number of operation times, which have not been performed in order of the operation sequence data, for each button of the second toolbar B2.

For example, the operation sequence data of FIG. 30 indicates that the button BU2 'character recognition' is operated secondarily. On the other hand, the operation hysteresis (FIG. 29) of the user B transmitted to the server apparatus 20' indicates that the number of times that the button BU2 'character recognition' has been operated thirdly other than secondarily is two times. In this case, the control unit 201' specifies '2' as a number of operation times, which have not been performed in order by the user B, for the button BU2 'character recognition', and associates and records the button name and the specified number of times, as shown in FIG. 31.

Also, the operation sequence data of FIG. 30 indicates that the button BU3 'page rearrangement' is operated thirdly. On the other hand, the operation hysteresis (FIG. 29) of the user B transmitted to the server apparatus 20 indicates that the number of times that the button BU3 'page rearrangement' has been operated secondarily other than thirdly is two times and the number of times that the button BU3 has been operated fourthly is one time. In this case, the control unit 201' specifies '3' as a number of operation times, which have not been performed in order by the user B, for the button BU3 'page rearrangement', and associates and records the button name and the specified number of times, as shown in FIG. 31.

Also, the operation sequence data of FIG. 30 indicates that the button BU4 'editing' is operated fourthly. On the other hand, the operation hysteresis (FIG. 29) of the user B transmitted to the server apparatus 20' indicates that the number of times that the button BU4 'editing' has been operated thirdly other than fourthly is one time. In this case, the control unit 201' specifies '1' as a number of operation times, which have not been performed in order by the user B, for the button BU4 'editing', and associates and records the button name and the specified number of times, as shown in FIG. 31.

The control unit 201' specifies a number of operation times, which have not been performed in order of the operation sequence data, for each button of the second toolbar B2 with respect to each user of the terminal apparatuses 10B' to 10E', and associates the button name, the specified number of times, the user name and the toolbar identifier and records the same in the storage unit 202'. FIG. 32 shows an example of the recorded data.

Then, the control unit 201' performs a cluster analysis for the recorded data of FIG. 32 by using a nearest neighbor method, for example, and records an analysis result in the storage unit 202'. When the analysis result is recorded in the storage unit 202', the control unit 201' controls the communication unit 205' to transmit the recorded analysis result to the terminal apparatus 10A' (step P26).

When the communication unit 105A' receives the analysis result transmitted from the server apparatus 20', the control unit 101A' controls the display unit 103A' to display the received analysis result. In the meantime, the analysis result displayed on the display unit 103A' may be displayed in a form of a map tree or dendrogram, for example.

Modified Embodiments

Although the second illustrative embodiment of the present invention has been described, the present invention is not limited to the above illustrative embodiment and can be implemented in diverse forms. For example, the present invention may be implemented by modifying the above illustrative embodiment as follows. In the meantime, the second illustrative embodiment and the following modified embodiments may be respectively combined.

In the above second illustrative embodiment, the analysis result of the cluster analysis is transmitted from the server apparatus 20' to the terminal apparatus 10A'. However, the data (FIG. 31), which indicates the number of operation times not performed in order specified for each button, not the analysis result of the cluster analysis, may be transmitted from the server apparatus 20' to the terminal apparatus 10A'.

Also, in the above second illustrative embodiment, the server apparatus 20' is configured to transmit the analysis result of the cluster analysis to the terminal apparatus 10A', in response to the request from the terminal apparatus 10A'. However, the server apparatus 20' may be configured to transmit the analysis result to the terminal apparatus 10A' at predetermined timing (for example, a specific day of week or a specific day).

In the above second illustrative embodiment, the data of the operation hysteresis is transmitted from the terminal apparatuses 10B' to 10E' to the server apparatus 20'. However, the data of the operation hysteresis may be transmitted to the terminal apparatus 10A' having prepared the toolbar data, and a table shown in FIG. 32 may be provided for the terminal apparatus 10A' having prepared the toolbar data. Also, in a configuration where the terminal apparatus 10A' having prepared the toolbar data has the table exemplified in FIG. 32, the control unit 101A' may be configured to perform a variety of analyses for data stored in the table, thereby displaying an analysis result on the display unit 103A'.

Figure 33:
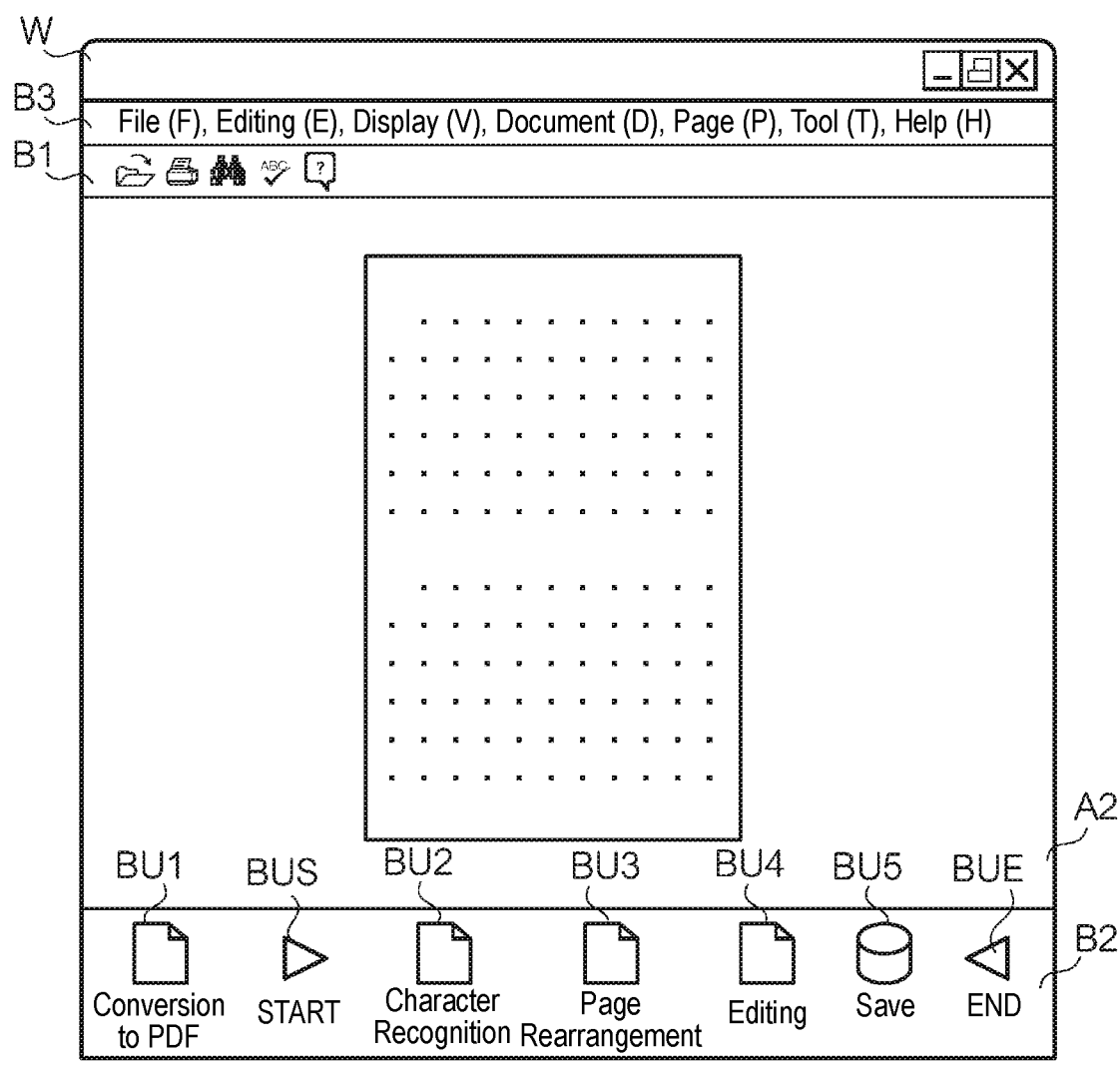
FIG. 33 illustrates an example of a GUI configured to be displayed on the terminal apparatus 10 according to a modified embodiment.

In the above second illustrative embodiment, the range of the second toolbar B2 for which the operation hysteresis is recorded is from the button BU1 to the button BUS. However, as shown in FIG. 33, a position of the START button BUS may be changed and the operation hysteresis may be recorded for the buttons BU2 to BU5. Also, a position of the END button BUE, not the position of the START button BUS, may be changed to change the range for which the operation hysteresis is recorded. Alternatively, both the START button BUS and the END button BUE may be changed to change the range for which the operation hysteresis is recorded.

Figure 34:
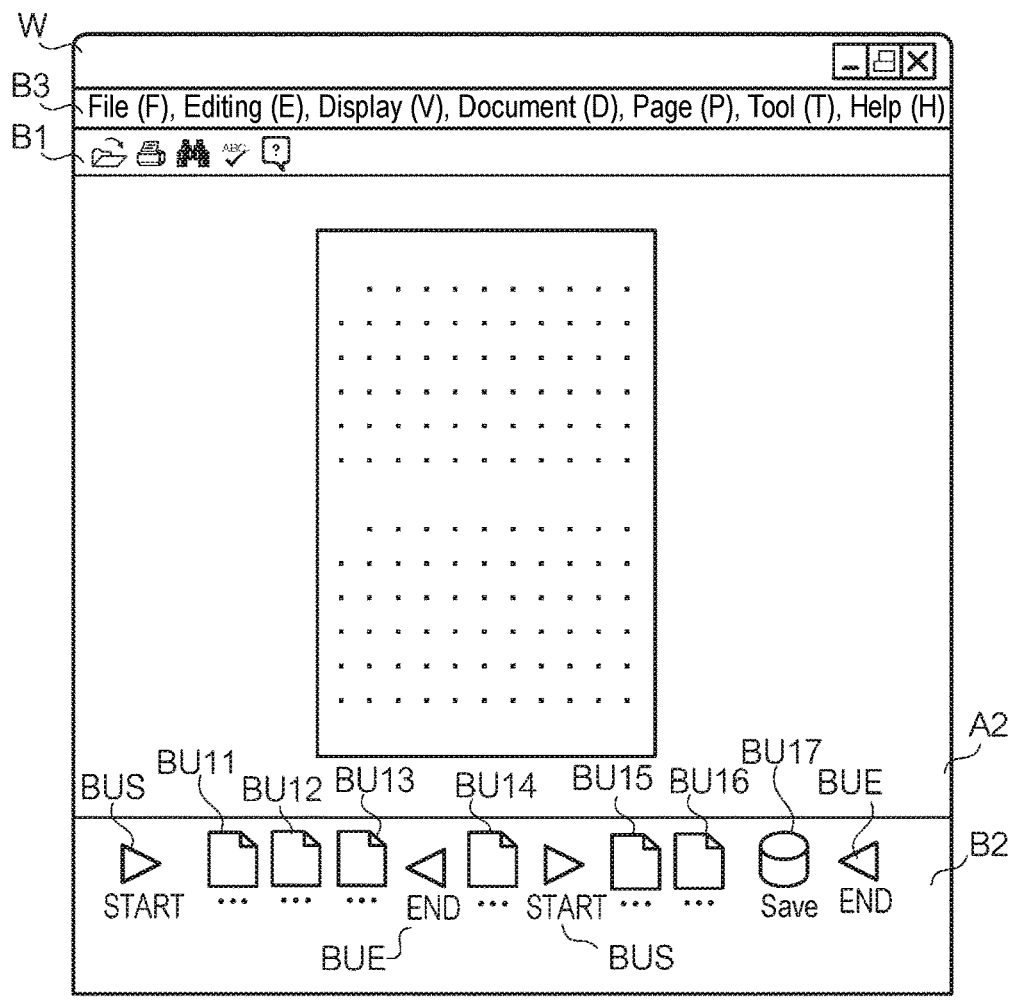
FIG. 34 illustrates an example of a GUI configured to be displayed on the terminal apparatus 10 according to a modified embodiment.

In the above second illustrative embodiment, the range of the second toolbar B2 for which the operation hysteresis is recorded is one. However, the present invention is not limited thereto. For example, as shown in FIG. 34, the START button BUS and the END button BUE may be arranged with buttons BU11 to BU13 being interposed therebetween, the START button BUS and the END button BUE may be arranged with buttons BU15 to BU17 being interposed therebetween, and the operation hysteresis for the buttons BU11 to BU13 and the operation hysteresis for the buttons BU15 to BU17 may be individually recorded.

Figure 35:
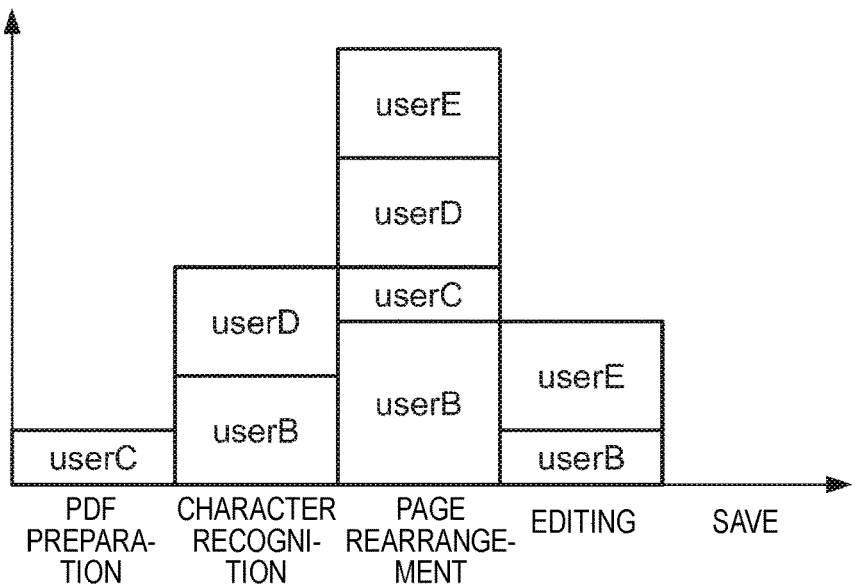
FIG. 35 illustrates an example of an analysis result to be displayed on the terminal apparatus 10 according to a modified embodiment.

In the above second illustrative embodiment, a tree map or dendrogram is displayed as an example of the analysis result of the operation hysteresis. However, the analysis result to be displayed is not limited to the tree map or dendrogram. For example, based on numerical values of the data stored in the table shown in FIG. 32, the number of operation times not performed in order of the arrangement may be displayed with a histogram for each button. Also, when displaying a histogram, the number of operation times not performed in order of the arrangement may be indicated by a height of a bar for each user, as shown in FIG. 35. Also, as shown in FIG. 35, when performing the display for each user, the bars are preferably displayed with being distinguished for each user. Thereby, it is possible to visibly know which user has not performed the operation in order of the arrangement.

In the above second illustrative embodiment, the document management application is configured to have one second toolbar B2 in the window. However, the present invention is not limited thereto. For example, as shown in FIG. 36, a plurality of tabs T1 to T3 may be provided in the window and the second toolbar B2 may be provided for each tab.

Figure 36:
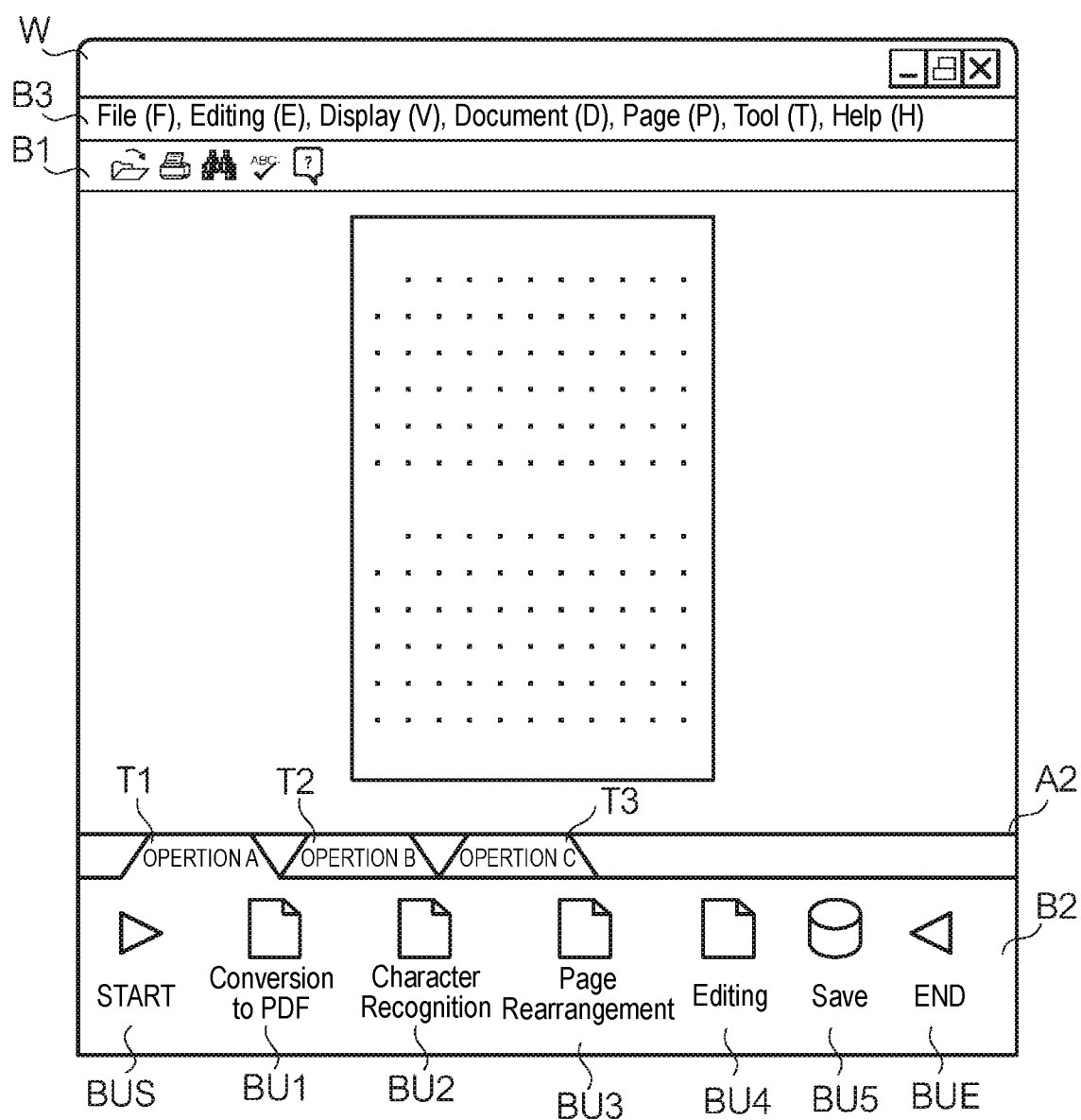
FIG. 36 illustrates an example of a GUI configured to be displayed on the terminal apparatus 10 according to a modified embodiment.
Figure 37:
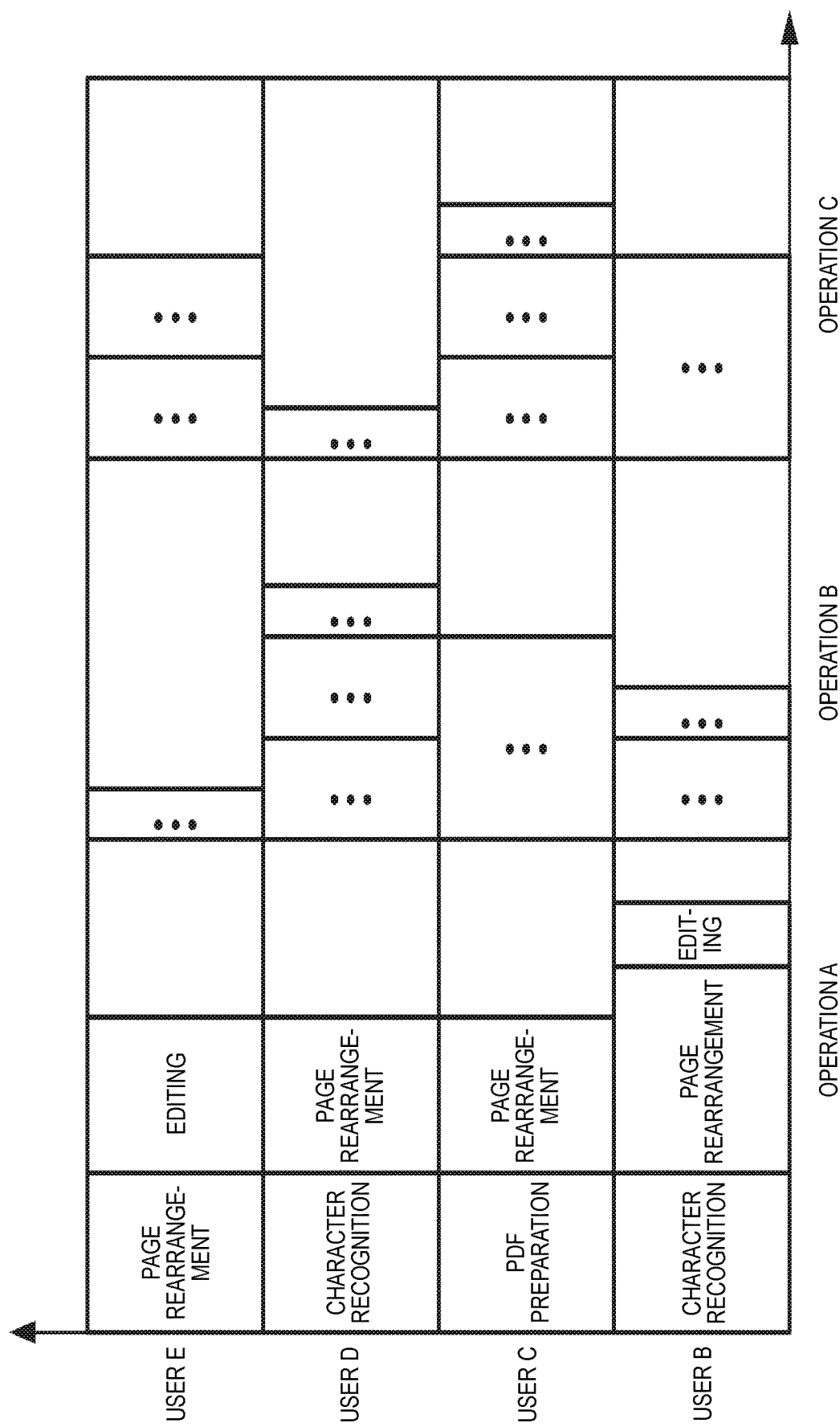
FIG. 37 illustrates an example of an analysis result to be displayed on the terminal apparatus 10 according to a modified embodiment.

Also, as shown in FIG. 36, in a configuration where the document management application has the second toolbar B2 for each tab, the operation hysteresis may be recorded and analyzed for the second toolbar B2 of each tab. Also, in a configuration where the operation hysteresis is recorded and analyzed for the second toolbar B2 of each tab, the number of times, which indicates that the button has not been operated in order of the arrangement, may be indicated with an area for each tab, as shown in FIG. 37. Also, as shown in FIG. 37, when displaying the number of times, which indicates that the button has not been operated in order of the arrangement, with an area, the number of times is preferably displayed with being distinguished for each button. Thereby, it is possible to visibly know which button has not been operated in order of the arrangement.

In the above second illustrative embodiment, the button name and the operated order are recorded with being associated, as the operation hysteresis. However, an identifier for uniquely identifying a button may also be used, instead of the button name.

In the above second illustrative embodiment, regarding the button on the second toolbar B2 operated in order different from the predetermined order, the number of operations times performed in different order is specified and the analysis result based on the specified number of operation times is displayed. However, the present invention is not limited thereto. For example, regarding an operation to be performed for the second toolbar B2, an operation to be performed by the user may be preset, a hysteresis of an operation different from the preset operation may be recorded and an analysis result obtained by analyzing the recorded analysis may be displayed. For example, a button for a short cut to a folder is arranged on the second toolbar B2. An operation to be performed by a user may be preset so that when the button is operated, a predetermined file is edited, and when an operation different from the operation is performed, a hysteresis of the operation may be recorded.

In the above second illustrative embodiment, the START button BUS and the END button BUE are displayed on the second toolbar B2 and the button for which the operation hysteresis is recorded is explicitly indicated. However, a configuration is also possible in which the START button BUS and the END button BUE are not provided and an operation hysteresis is recorded for a predetermined button.

The program of each apparatus of the present invention may be provided with being recorded in a computer-readable recording medium such as a magnetic recording medium (magnetic tape, magnetic disk (HDD (Hard Disk Drive), FD (Flexible Disk) and the like), an optical recording medium (optical disk and the like), an optical magnetic recording medium, a semiconductor memory and the like and then installed. Also, the program may be downloaded and installed through a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program for enabling a computer to function as:
    an editor configured to edit an arrangement of a plurality of pictograms in a display area, the plurality of pictograms corresponding to functions to be executed;
    a generator configured to generate hysteresis information indicating a hysteresis of the edit;
    a first transmitter configured to transmit display area information indicating the display area to other terminal apparatus;
    a receiver configured to receive hysteresis information indicating a hysteresis of processing relating to the display area indicated by the display area information, the processing being performed in the other terminal apparatus;
    a display unit configured to correlate and display the hysteresis information generated by the generator and the hysteresis information received by the receiver; and
    a second transmitter configured to transmit the hysteresis information generated by the generator and the hysteresis information received by the receiver to a terminal apparatus which has transmitted the display area information to the computer.

2. The non-transitory computer readable medium according to claim 1,
    wherein when it is not possible to transmit the hysteresis information to the terminal apparatus which has transmitted the display area information to the computer, the second transmitter transmits the hysteresis information to a terminal apparatus which has transmitted the display area information to the terminal apparatus which has transmitted the display area information to the computer.

* * * * *